US007999810B1

(12) United States Patent
Boice et al.

(10) Patent No.: US 7,999,810 B1
(45) Date of Patent: Aug. 16, 2011

(54) SYSTEM AND METHOD FOR ANIMATED COMPUTER VISUALIZATION OF HISTORIC EVENTS

(76) Inventors: Gina L. Boice, Parker, CO (US); James L. Black, Centennial, CO (US)

( * ) Notice: Subject to any disclaimer, the term of this patent is extended or adjusted under 35 U.S.C. 154(b) by 1107 days.

(21) Appl. No.: 11/514,025

(22) Filed: Aug. 30, 2006

(51) Int. Cl.
*G06T 13/00* (2006.01)
(52) U.S. Cl. ........................................ 345/473
(58) Field of Classification Search .................. None
See application file for complete search history.

(56) References Cited

U.S. PATENT DOCUMENTS

| | | | | |
|---|---|---|---|---|
| 5,519,828 A * | 5/1996 | Rayner | ...................... | 715/723 |
| 5,781,188 A * | 7/1998 | Amiot et al. | .................. | 715/723 |
| 5,966,121 A | 10/1999 | Hubbell et al. | | |
| 6,061,062 A * | 5/2000 | Venolia | ........................ | 715/856 |
| 6,188,396 B1 * | 2/2001 | Boezeman et al. | ........... | 715/202 |
| 6,469,711 B2 * | 10/2002 | Foreman et al. | ............. | 715/723 |
| 7,207,007 B2 * | 4/2007 | Moriwake et al. | ........... | 715/723 |
| 2002/0188628 A1 | 12/2002 | Cooper et al. | | |
| 2003/0061305 A1 | 3/2003 | Copley et al. | | |
| 2003/0097640 A1 | 5/2003 | Abrams et al. | | |
| 2003/0146915 A1 * | 8/2003 | Brook et al. | .................. | 345/473 |
| 2004/0153456 A1 | 8/2004 | Charnock et al. | | |
| 2005/0086238 A1 | 4/2005 | Nevin, III | | |
| 2005/0086534 A1 | 4/2005 | Hindawi et al. | | |
| 2006/0022983 A1 * | 2/2006 | Gauthier et al. | ............. | 345/473 |
| 2006/0129933 A1 * | 6/2006 | Land et al. | ..................... | 715/723 |
| 2006/0238538 A1 * | 10/2006 | Kapler et al. | ................. | 345/440 |

OTHER PUBLICATIONS

Thomas, K., William, W., GeoTime Information Visualization, Feb. 2005, Palgrave Macmillan, vol. 4, pp. 136-146.*
Plaisant, C., Mushlin, R., Snyder, A., Li, J., Heller, D., Shneiderman, B., LifeLines: Using Visualization to Enhance Navigation and Analysis of Patient Records, Nov. 1998, Proceedings of American Medical Informatics Association 1998, pp. 76-80.*
Internet site www.casesoft.com and information pamflet from that site for Timemap software, last page of pamflet indicates winner of award in 2004.

* cited by examiner

*Primary Examiner* — Said Broome
(74) *Attorney, Agent, or Firm* — Ramon L. Pizarro; Edwin M. Crabtree

(57) ABSTRACT

A computer-implemented method for collecting, animating in chronological sequence, and presenting the progression of events is disclosed. The method includes providing a set of event data to form a database, the data relating to events that constrained or led up to some of the events. Then presenting the database as a grid to allow user selection and editing of the Event data in the database to create a set of Events to be presented in an animated manner, and then assigning properties to the manner of presentation of the set of Events to be presented in an animated manner to create a movie. The movement of the movie is provided by an engine that moves a cursor along the timeline to represent the forward or backward change of time and displaying a marker representing an Event from Event data contained in the database.

12 Claims, 23 Drawing Sheets

FIG 2

BaseEvents Table Design

| Field Name | Data Type | |
|---|---|---|
| UniqueEventID | AutoNumber | Unique key identifying Event. |
| EventID | Text | User-visible string that identifies an Event within a Project. |
| ProjectID | Text | Project to which Event belongs. (EventID, ProjectID) must be unique. |
| Duration | Number | Length of time between StartTime and EndTime |
| StartTime | Date/Time | Date/time on which Event started. |
| EndTime | Date/Time | Date/time on which Event ended. |
| ClassificationID | Text | Classification of Event. |
| ShortTitle | Text | Brief Event description that labels Marker or Callout Box. |
| Description | Memo | Full Event description appearing in DrillDown Box. |
| RollupID | Number | Event under which this Event rolls up |
| IsTransitory | Yes/No | If "Yes" the Event is Transitory. If "No" the Event is Persistent. |
| StartIsActual | Yes/No | If "Yes" then the StartTime is actual. Otherwise it is a planned StartTime. |
| EndIsActual | Yes/No | If "Yes" then the EndTime is actual. Otherwise, it is a planned end date. |
| HasRelatedEvents | Yes/No | If "Yes" the Event has Dependencies with other Events. |
| HasAttachments | Yes/No | If "Yes" the event has one or more attachments. |
| UserDefString | Text | User-defined field of String Format |
| UserDefString2 | Text | User-defined field of String Format |
| UserDefNumber | Number | User-defined field of Numerical Format |
| UserDefBoolean | Yes/No | User-defined Boolean field |
| UserDefDate | Date/Time | User-defined DateTime field |

FIG 4

Projects Table Design

| Field Name | Data Type | Description |
|---|---|---|
| ProjectID | Text | Unique identifier for this Project |
| CreationDate | Date/Time | Date/time on which this Project was created |
| ModificationDate | Date/Time | Date/time on which this Project was most recently modified |
| ProjectDescription | Text | Description for this Project |

FIG 5

EventClassifications Table Design

| Field Name | Data Type | Description |
|---|---|---|
| ClassificationID | Text | Identifier key for this classification |
| ClassificationDescription | Text | Description of this classification |

FIG 6

EventPredecessorJunction Table Design

| Field Name | Data Type | Description |
|---|---|---|
| PredecessorUniqueEventID | Number | UniqueEventID for Event that precedes (Temporal) or causes (Causal) Follower Event. |
| FollowerUniqueEventID | Number | UniqueEventID for Event that follows (Temporal) or results from (Causal) Predecessor Event. |
| RelationshipType | Text | Relationship between predecessor and follower (e.g. "FS", "FF", "SS", "CausedIt" ...). |
| TimeLag | Number | Time interval for Temporal Dependency. If we have "FS + "10" days," then 10 appears here. |

FIG 7

Attachments Table Design

| Field Name | Data Type | Description |
|---|---|---|
| AttachmentID | AutoNumber | Unique identifier for this attachment |
| FileName | Text | Filename (not including path) for the file of this attachment |
| AttachmentMethod | Number | Type of attachment (0 = Copied File, 1 = URL, 2 = Link) |

FIG 8

AttachmentEventsJunction Table Design

| Field Name | Data Type | Description |
|---|---|---|
| UniqueEventID | Number | Foreign key pointing to UniqueEventID in BaseEvents and SnapshotEvents tables |
| SnapshotID | Number | Foreign key that identifies the Snapshot for a Persistent Event. |
| AttachmentID | Number | Foreign key that points to the AttachmentID in the Attachments table |

FIG 9

Snapshots Table Design

| Field Name | Data Type | Description |
|---|---|---|
| SnapshotID | AutoNumber | Unique snapshot identifier across all Projects. |
| SnapshotNumber | Number | User-visible Snapshot number that is unique only within a Project. |
| ProjectID | Text | Project to which this Snapshot belongs. |
| SnapshotTime | Date/Time | Date/time of this Snapshot. |
| SnapshotDescription | Text | Commentary on this Snapshot. |
| Propagate | Yes/No | If TRUE, this Snapshot is Recursive. If FALSE, this Snapshot is Literal. |

FIG 10

SnapshotEvents Table Design

| Field Name | Data Type | Description |
|---|---|---|
| UniqueEventID | Number | Foreign key equal to UniqueEventID of BaseEvents table. |
| SnapshotID | Number | Foreign key to SnapshotID in Snapshots table. |
| NewStartTime | Date/Time | Altered beginning date/time of this Snapshot Event. |
| NewEndTime | Date/Time | Altered ending date/time of this Snapshot Event. |
| NewDuration | Number | Altered duration of this Snapshot Event. |
| HasAttachments | Yes/No | If "Yes", there are attachments for this Snapshot Event. |
| HasRelatedEvents | Yes/No | If "Yes", there are Dependencies for this Snapshot Event. |

FIG 11

Movies Table Design

| Field Name | Data Type | Description |
|---|---|---|
| MovieName | Text | Name of the Movie. |
| CreationDate | Date/Time | Date on which this Movie was created. |
| ModificationDate | Date/Time | Date on which this Movie was last modified. |
| Owner | Text | Who owns the Movie. |
| StartTime | Date/Time | Exclude from Movie all Events prior to this date/time. |
| EndTime | Date/Time | Exclude from Movie all Events after this date/time |
| GraphTitle | Text | Title that appears on Graph of this Movie |
| GraphSecondTitle | Text | Secondary title for Graph of this Movie |
| TimeScaleMajor | Text | Major divisions on time axis (year, quarter, month, ...) |
| AnimationTimeUnitType | Text | Type of time unit for incrementing timestep (year, quarter, month, ...) |
| DaysPerUnit | Number | Number of days per unit of measure on the time axis |
| TracksPerUnit | Number | Number of tracks per unit of measure on the time axis |
| FilterString | Text | String that controls row filtering to define the Events of the Movie. |
| MovieSpeed | Number | Speed of Movie Playback; Enum value: 0=Low, 1=Medium, 2=High |
| TimeSample | Number | Time interval between updates of Transitory events as movie is playing; time interval when single-stepping. |
| TimeTolerance | Number | Time interval left and right of Time Cursor that define Time Window. |
| Smoothness | Number | Smoothness of Movie Playback: Enum value: 0=Low, 1=Medium, 2=High. |
| TrackCount | Number | Number of Swim Lanes on the Graph. |
| PersistentTrackFraction | Number | Fraction of Swim Lanes for Persistent Events in default allocation algorithm |
| PageHeight | Number | Height of the page in units |
| PageWidth | Number | Width of the page in units |
| LeftMargin | Number | Left margin in units |
| RightMargin | Number | Right margin in units |
| TopMargin | Number | Top margin in units |
| BottomMargin | Number | Bottom margin in units |
| ScrollJump | Number | Fraction pertaining to horizontal scrolling |
| CalloutHeight | Number | Height of callout box in units |
| CalloutWidth | Number | Height of callout box in units |
| GreenZoneFraction | Number | Horizontal Scrolling Trigger (between 0 and 1) |
| RedZoneFraction | Number | Horizontal Scrolling Triger (between 0 and 1) |
| TextMaxCallout | Number | Max number of characters in callout box |
| TextMaxMarker | Number | Max number of characters in marker caption |
| CalloutFontSize | Number | Size of font in callout boxes |
| MarkerFontSize | Number | Size of font in marker captions |
| TrackFillFactor | Number | Fraction of Swim Lane occupied by Marker (between 0 and 1) |
| ShowSwimlanes | Yes/No | Flag that shows Swim Lanes as horizontal lines when TRUE |
| ShowTimes | Yes/No | If TRUE, date/times are formatted to show the times as well as the dates. |
| PointEventGradients | Yes/No | If TRUE, point-event markers are drawn with gradients. |

FIG 12

MoviesEventJunction Table Design

| Field Name | Data Type | Description |
|---|---|---|
| UniqueEventID | Number | Foreign Key from BaseEvents table. |
| MovieName | Text | Foreign Key from Movies table. |
| Track | Number | Tells which Swim Lane this Event belongs to for this Movie. |
| Color | Text | Tells which color to use to display this Event in this Movie. |
| IsSelected | Yes/No | If TRUE, this Event will be displayed in Movie Graph. |

FIG 13

SYSTEM AND METHOD FOR ANIMATED COMPUTER VISUALIZATION OF HISTORIC EVENTS

BACKGROUND OF THE INVENTION (a) Field of the Invention

The present invention relates to a system and method for creating, presenting, and interacting with animated depictions of past sequences of events and/or of plans that changed over time, using a computer database and computer visualization. More particularly, but not by limitation, to a computer-implemented system for presenting time-sequenced events and associating these events with other events on a screen in order to aid the user in assimilating causes and effects among the events.

(b) Discussion of Known Art

A central aspect of modern business is the execution of projects, i.e. those organized activities with definite business goals and definite beginnings and endings. Projects encompass undertakings such as developing a new consumer-electronics product, creating a new financial service, upgrading a company's IT infrastructure, testing a new pharmaceutical product, pursuing litigation, launching a communications satellite, building a highway, and developing a new software product. Projects are often complex undertakings, with external dependencies, execution constraints, resource problems, scope changes, and the need to deal with unplanned events.

It is important for businesses to learn from previous projects in order to improve operational performance on future projects, but extracting usable knowledge and action plans from historical project data is challenging. The data is often voluminous, disorganized, and without context. Furthermore, people often have selective memories, forming their own interpretations of project histories and avoiding the exploration of alternative diagnoses. Finally, there is often the desire to proceed to the next project rather than to spend time analyzing what has already happened. This invention mitigates these problems by integrating project-history information into an animated retrospective context: an intuitive, interactive "movie" of the project's history, showing events that happened and how these may have affected the project's changing plans.

A related challenge of modern society is the need to investigate complex sequences of past events, looking for who is at fault, whether someone broke the law, or what caused something to go wrong. For example, law-enforcement investigators pursuing criminals must gather, filter, and establish relationships among sequences of phone calls, e-mails, memos, witness recollections, and transactions. Likewise, National Transportation Safety Board investigators must examine and relate complex sequences of human, mechanical, electrical, and meteorological events that preceded a plane crash. Litigation attorneys must collect large numbers of files, e-mails, phone records, and transactions to establish cause-effect relationships when building civil cases or defending against them. Just as in the case of project retrospectives, such activities involve looking back in time at plans that were in place and at events that occurred, trying to establish relationships among events and/or plans to persuasively support arguments about what really happened. And, as in the case of business projects, the challenges are the volume of data, its disorganization, and the lack of a unifying framework. This invention mitigates these challenges by integrating time-sequenced events and changing plans into a computerized, animated movie that makes it possible to see relationships among a large number of events and changing plans.

Current computer-based tools for collecting and managing time-sequenced project data include Microsoft® Office Project and its market competitors, such as SureTrak® Project Manager from Primavera Systems, Inc. Such tools allow users to build, track, and display project plans, times, dependencies and resources. However, a major limitation of such tools is their inability to display how plans changed as time passed. A second major limitation is that such tools do not easily handle the unplanned events that had an influence on the project outcome. A third major limitation of such tools is their difficulty in presenting large amounts of time-sequenced data in an easily comprehended fashion.

For the related problem of organizing time-dependent events onto a timeline for carrying out an investigation, there are some commercially-available software packages that are capable of producing static timelines. Static timelines display all the events at once, having no capability to sequentially display a limited time window of events to the viewer in animated fashion. One example is the software sold under the trademark TimelineProject from Timeline Studio (www.timelinestudio.co.uk). This tool focuses on producing static timelines annotated with text, markers, and images. It also allows the creation of a step-by-step guide to assembly of an object as the user advances along the timeline. Another example is the program sold under the trademark TimelineMaker Professional by Progeny Software, Inc. (www.timelinemaker.com). This software produces static timelines annotated with text, markers, and images.

Finally, there are several general-purpose software applications for creating presentation graphics, such as Microsoft® Office PowerPoint, Microsoft® Office Excel, Microsoft® Office Visio, IBM Freelance, Lotus 1-2-3, and Suite Edition by SmartDraw.com (www.smartdraw.com). These software packages allow users to create a wide variety of drawings, including static timelines that can be annotated with text, markers, and images.

Neither existing project-management software, static-timeline tools, nor the general-purpose presentation graphics solves the problem of presenting a large amount of time-dependent event data and its dependencies in a comprehensible manner. Nor can these approaches easily display the evolution of past plans as time progressed.

It is possible to combine drawing tools such as Microsoft® Office Visio with "slide show" tools such as Microsoft® Office Powerpoint to create an animated historical movie with some similarity to the movies produced in this invention. However, making such a movie is an arduous and error-prone manual process and does not permit the user to interact with an event database.

Therefore, a review of known systems reveals that there remains a need for a system that allows a user to organize time-sequenced event data, indicate purported relationships among events and plans, show changes in plans, and present both time-dependent event and plan data in an animated fashion in chronological order on a viewable screen.

There remains a need for a computer-implemented system or "software" system that provides tools for collecting, organizing, and presenting past events on a screen in an animated fashion.

There remains a need for a system that allows a user to organize time-sequenced event and plan data, present both time-dependent event and plan data in an animated fashion in chronological order on a viewable screen, and allow the user to pause the animated presentation in order to explore individual events, plans, and relationships among them in more detail.

There remains a need for a computer-implemented system that provides tools for displaying a more readily comprehensible subset of a large number of past events with the aid of a moving cursor, by displaying on the screen only those events whose times fall within a time window that contains the cursor.

There remains a need for a computer-implemented system that provides tools for collecting, organizing, and presenting the changes in past plans on a screen by displaying snapshots of the tasks in the plan at one time in the past and by changing from one snapshot to the next as a moving cursor advances across the screen to other times in the past.

There remains a need for a computer-implemented system that allows the creation and dissemination of a screen-viewable presentation of past events with the aid of a moving cursor that advances across the screen, highlighting markers representing time-windowed events in chronological order and associating an event with other events that purportedly had an effect on it while its marker is being highlighted.

There remains a need for a computer-implemented system that allows the creation and dissemination of a screen-viewable presentation of planned events with the aid of a moving cursor that advances across the screen, highlighting markers representing events that purportedly caused changes in the planned events from one snapshot to the next.

SUMMARY

The current invention overcomes the limitations of existing approaches by using computer software that enables users to import, select, edit, filter, organize, present in animated fashion, and explore details of historical events and historical plans.

Hereafter, since the invention treats past events and past plans in a unified manner, an "Event" will refer to something that either happened in the past, began in the past, or is a task in a plan. Hereafter a "Movie" will refer to the animated presentation of these Events. For some Movies only the Event date is relevant whereas for other Movies both the Event date and Event time are relevant. To be consistent, the combined date-time of an Event (e.g. Jul. 17, 2006 5:35:22 pm) will be referred to as its "Time." In any place in this patent description where the word "date" appears in a database field definition or field description, it shall be understood to mean Time in the sense defined here.

Furthermore an Event is either a "Point Event," meaning that it happened at a single Time, or it is an "Extended Event," meaning that it happened over a Time interval that has both a start time (hereafter "StartTime") and an finish Time (hereafter "EndTime").

Finally the invention classifies each event as either a "Transitory Event" or a "Persistent Event." If the Event's marker appears on the screen only when the Event StartTime or EndTime is within the time window that includes the cursor, then the Event is a "Transitory Event." If an Event's marker remains on the screen regardless of the position of the cursor, then the Event is a "Persistent Event."

A preferred example of the invention is a computer-implemented program that is used to carry out the steps, the steps including:

Providing for a user-created database (hereafter ⁑Database ⁂) the data in the Database relating to Events and dependencies that the user believes to have led up to some of the Events and to changes in some of the Events;

presenting the Database in a manner that allows a user to select and edit the data that is stored in the Database to create a set of Events to be presented in an animated manner;

assigning properties to the manner of presentation of the set of Events to be presented in an animated manner to create a Movie; and providing a software computation facility (hereafter "Engine") that moves a time cursor (hereafter "Cursor") along an axis labeled by Time (hereafter "Timeline"), that displays symbolic graphical representations (hereafter "Markers") of Events in an animated chronological sequence, displaying the Marker for a Transitory Event when the Event's Time falls within a time window surrounding the Cursor and displaying each Persistent Event with Marker Times that are determined by the version of the Persistent Events (hereafter "Snapshot") that contains the Cursor.

These Movies allow people to grasp the important trends and purported chains of events from an overview perspective. They also enable users to pause the animation and scrutinize Events by examining document attachments and purported dependencies upon other Events.

Thus, it will be understood that the disclosed invention serves as a data management and data visualization system designed specifically for creating movies for the understanding, visualization, and communication of historical data. In other words, the disclosed system is a computer-implemented program that allows a user to assemble relevant Event data in the Database, then allows the user to connect the Events to each other, and provides graphics or other visual or audible features to enhance the impact of the particular Event when presented on the screen. Once the Database has been assembled, the computer-implemented program includes an Engine that presents Events on a screen in chronological order as a Cursor advances along a Timeline, displaying Transitory Events when they fall within a Time Window associated with the moving Cursor, displaying each Snapshot of Persistent Events as the Cursor moves into the window of time to which that Snapshot applies (hereafter "Snapshot Interval"), providing for the association of various Events, and allowing the user to pause the Movie to explore file attachments and to investigate purported dependencies among Events.

A highly preferred example of the invention includes the following architectural components:

A Database schema comprising the Database tables: BaseEvents, Projects, Classifications, EventPredecessorJunction, Attachments, AttachmentEventJunction, Snapshots, SnapshotEvents, Movies, and MoviesEventJunction.

Steps for importing Event data and associated documents and media into the Database and into an Attachment Repository from external sources.

Tools for adding, editing and deleting data in the Database and for specifying relationships among the Events and Event attributes in the Database.

Steps for filtering data in the Database to select Event subsets for inclusion in a Movie.

Tools for specifying visibility, color, position, symbol, size and other attributes of the Marker for each Event in a Movie. Engine that plays back the Movie as an animated presentation on a computer screen, allowing the user to pause, stop, single-step, rewind, fast-forward, and play the Movie.

Method that allows the user to interact with a paused or stopped Movie to explore Events of interest by browsing further details, by viewing attachments, or by examining purported dependencies among Events.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 2 is a screen shot showing an example of the mapping of fields from the External Event Data to the Database as part of the Event Importer step.

FIG. 4 is the design of the BaseEvents table in the highly preferred implementation, showing preferred field names and field types. This table is the main table of attributes for Events.

FIG. 5 is the design of the Projects table in the highly preferred implementation, showing preferred field names and field types. This table contains attributes that describe each Project in the Database.

FIG. 6 is a design of the EventClassifications table in the highly preferred implementation, showing preferred field names and field types. This table contains classifications that can be associated with Events to enable the software to assign specific Marker attributes (e.g. color, Swim Lane, etc.) to specific classifications of Events.

FIG. 7 is a design of the EventPredecessorJunction table in the highly preferred implementation, showing preferred field names and field types. Each row of this table represents a dependency. (either Temporal or Causal, depending on the value of the field "RelationshipType") between two Events.

FIG. 8 is a design of the Attachments table in the highly preferred implementation, showing preferred field names and field types. This table keeps track of all files or hyperlinks (e.g. Internet Universal Resource Locator (URL)) that are attached to Events in the Database.

FIG. 9 is a design of the AttachmentEventJunction table in the highly preferred implementation, showing preferred field names and field types. Each row of this table associates one attached file or hyperlink with one Event in the Database.

FIG. 10 is a design of the Snapshots table in the highly preferred implementation, showing preferred field names and field types. Each row represents a specific Snapshot for a specific Project. The SnapshotTime field determines the start of the Snapshot Interval for each Snapshot. The SnapshotTime field of the next Snapshot in time order determines the end of the Snapshot Interval for each Snapshot.

FIG. 11 is a design of the SnapshotEvents table in the highly preferred implementation, showing preferred field names and field types. Each row represents a change to a specific Persistent Event for a specific Snapshot. For example, a Persistent Event would have a new StartTime if there were a value in the field NewStartTime. This new StartTime would override the StartTime for the Event in the BaseEvents table and would also override the StartTime for the Event in any earlier Snapshots.

FIG. 12 is a design of the Movies table in the highly preferred implementation, showing preferred field names and field types. Each row in this table represents one Movie attribute that applies to the Movie as a whole.

FIG. 13 is a design of the MoviesEventJunction table in the highly preferred implementation, showing preferred field names and field types. Each row in this table describes the attributes that are specific to one Event appearing in one Movie. For example, one field in the row describes the color that the Event's Marker displays in the Movie.

Figure 14:
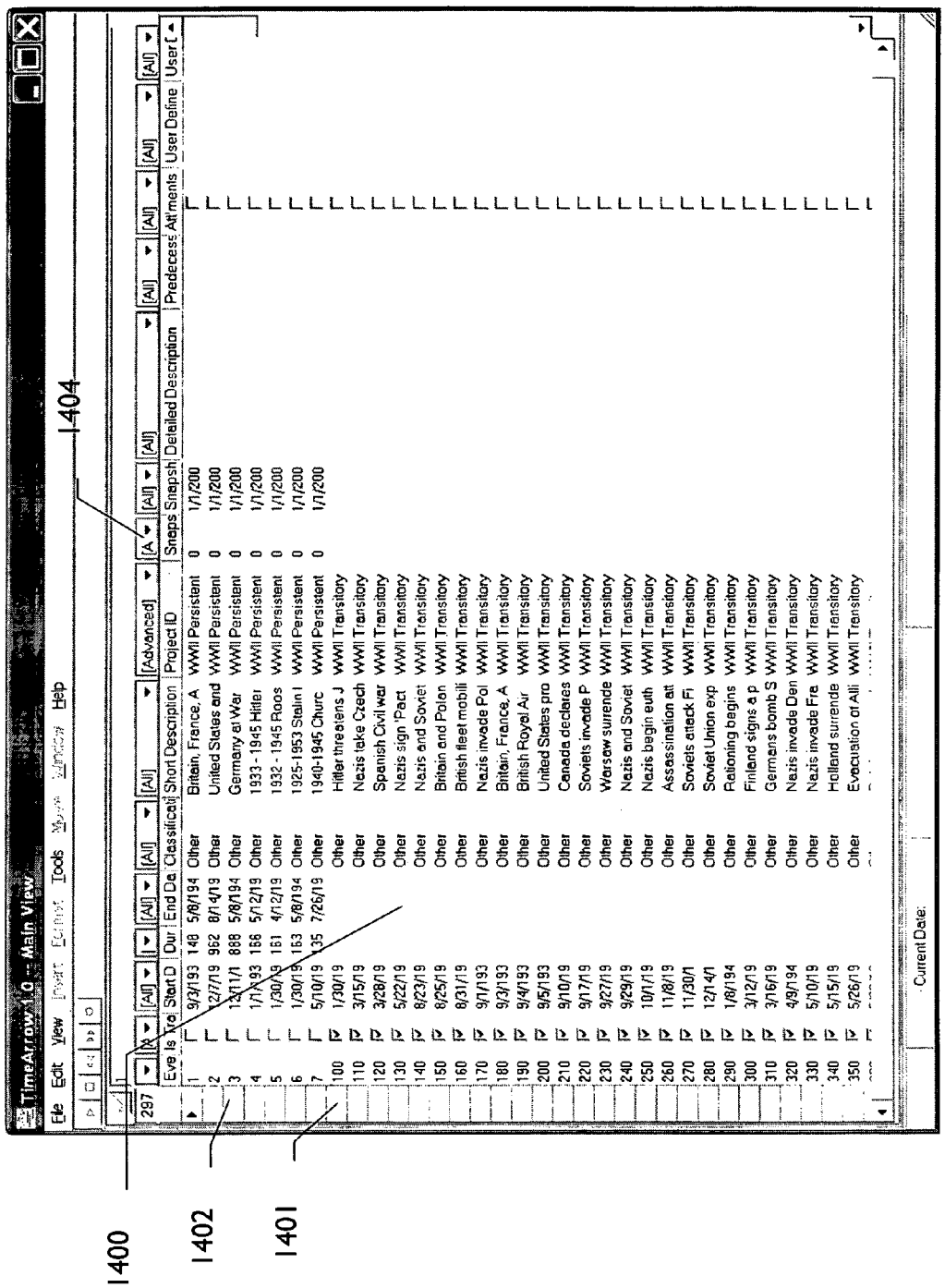

FIG. 14 is a screen shot of the users' main view of the Database, showing the spreadsheet-like interface in which users can edit, add, and delete Event attributes that reside in the Database.

Figure 15:
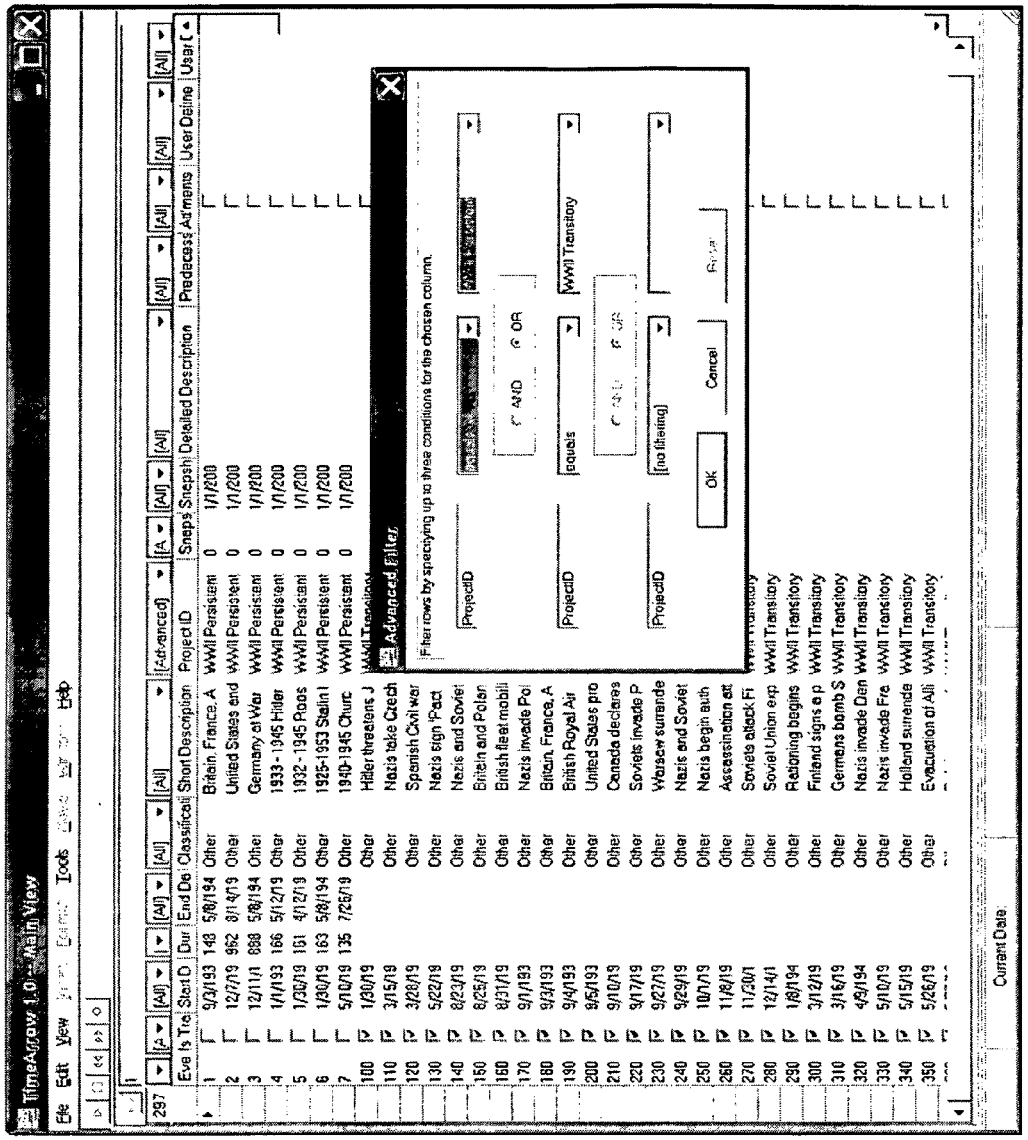

FIG. 15 is a screen shot that shows an example of the filtering of Events as the user is establishing which Events to include in a new Movie.

Figure 16:
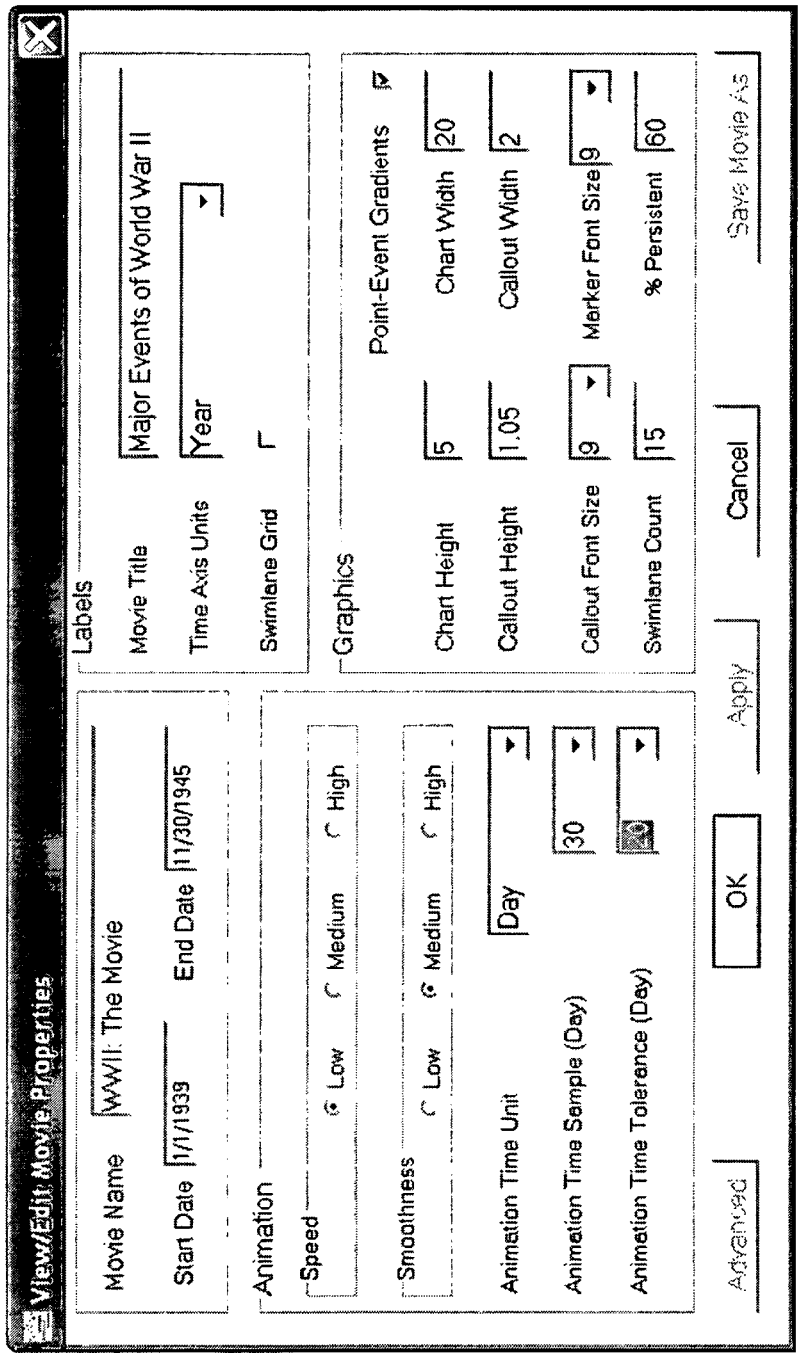

FIG. 16 is a screen shot that shows how the user sets parameters for a Movie that apply to all Events in the Movie.

Figure 17:
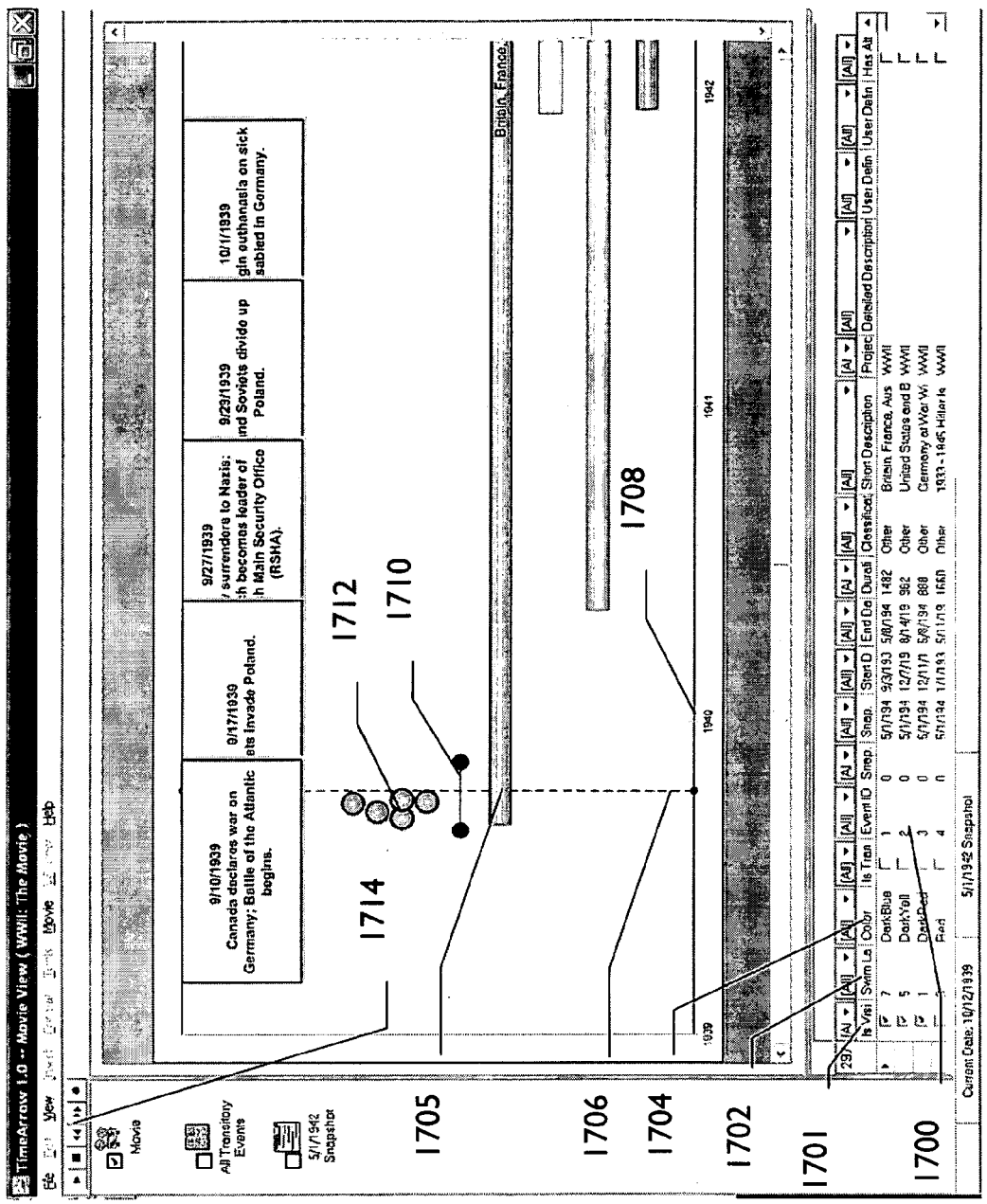

FIG. 17 is a screen shot of the Graph of a paused Movie with Event Markers displayed, illustrating the use of the Time Window surrounding the Cursor to determine the display of Transitory Events.

Figure 18:
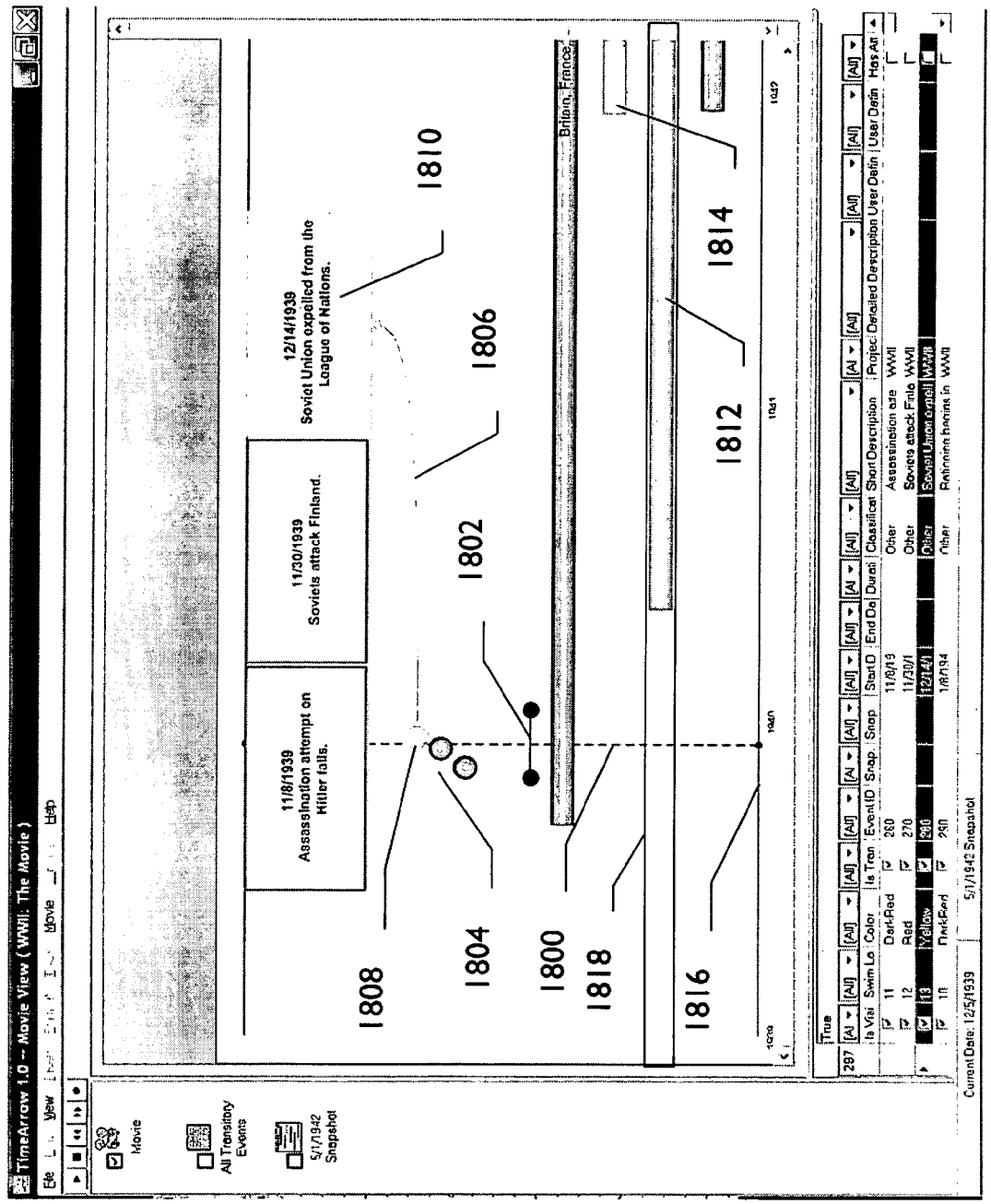

FIG. 18 is a screen shot of the Graph of a paused Movie showing how a different set of Transitory Events is displayed when the Cursor moves, moving its Time Window along with it. The two successive frames of FIG. 17 and FIG. 18 illustrate one major form of animation in this invention: the moving Cursor leads to different sets of Transitory Events appearing on the screen in chronological succession.

Figure 19:
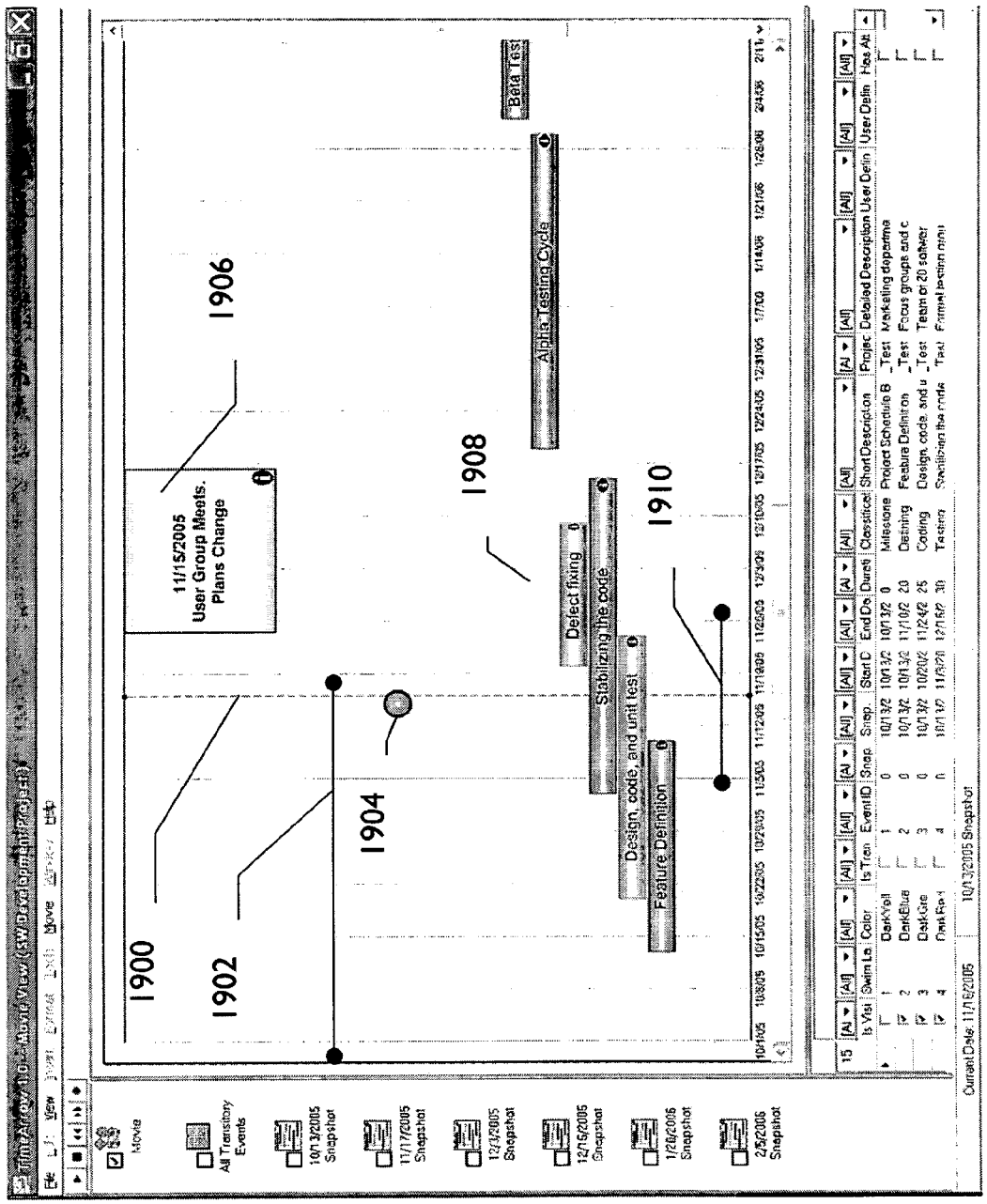

FIG. 19 is a screen shot of the Graph of a paused Movie with Persistent Events displayed for the first Snapshot of the Movie. The Engine displays all Persistent Events with the StartTimes and EndTimes that it computes for the first Snapshot.

Figure 20:
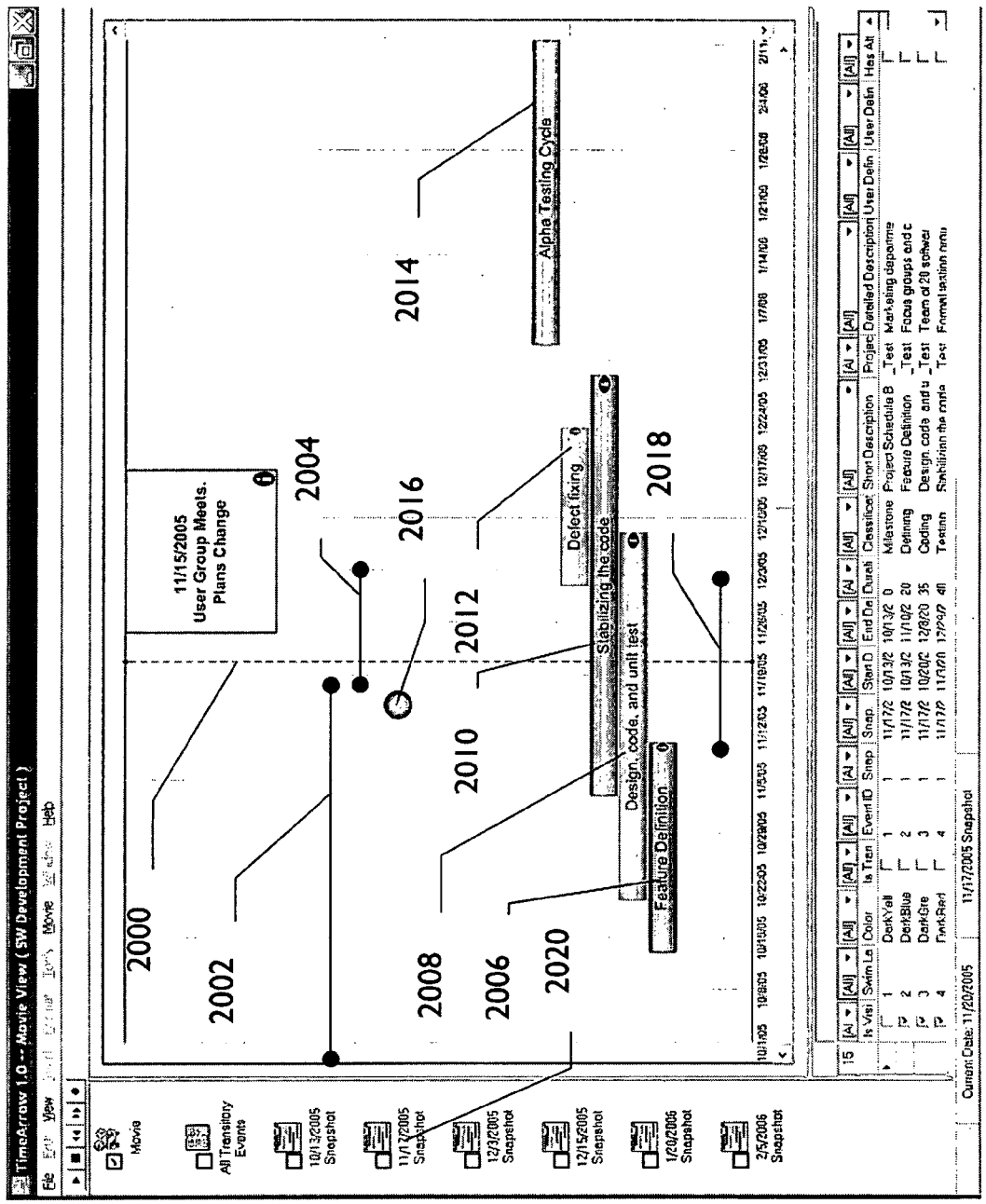

FIG. 20 is a screen shot of the Graph of a paused Movie with Persistent Events displayed for the second Snapshot of the Movie, after the Cursor has moved into the Snapshot Interval for the second Snapshot. The Engine displays all Persistent Events with the StartTimes and EndTimes that it computes for the second Snapshot.

Figure 21:
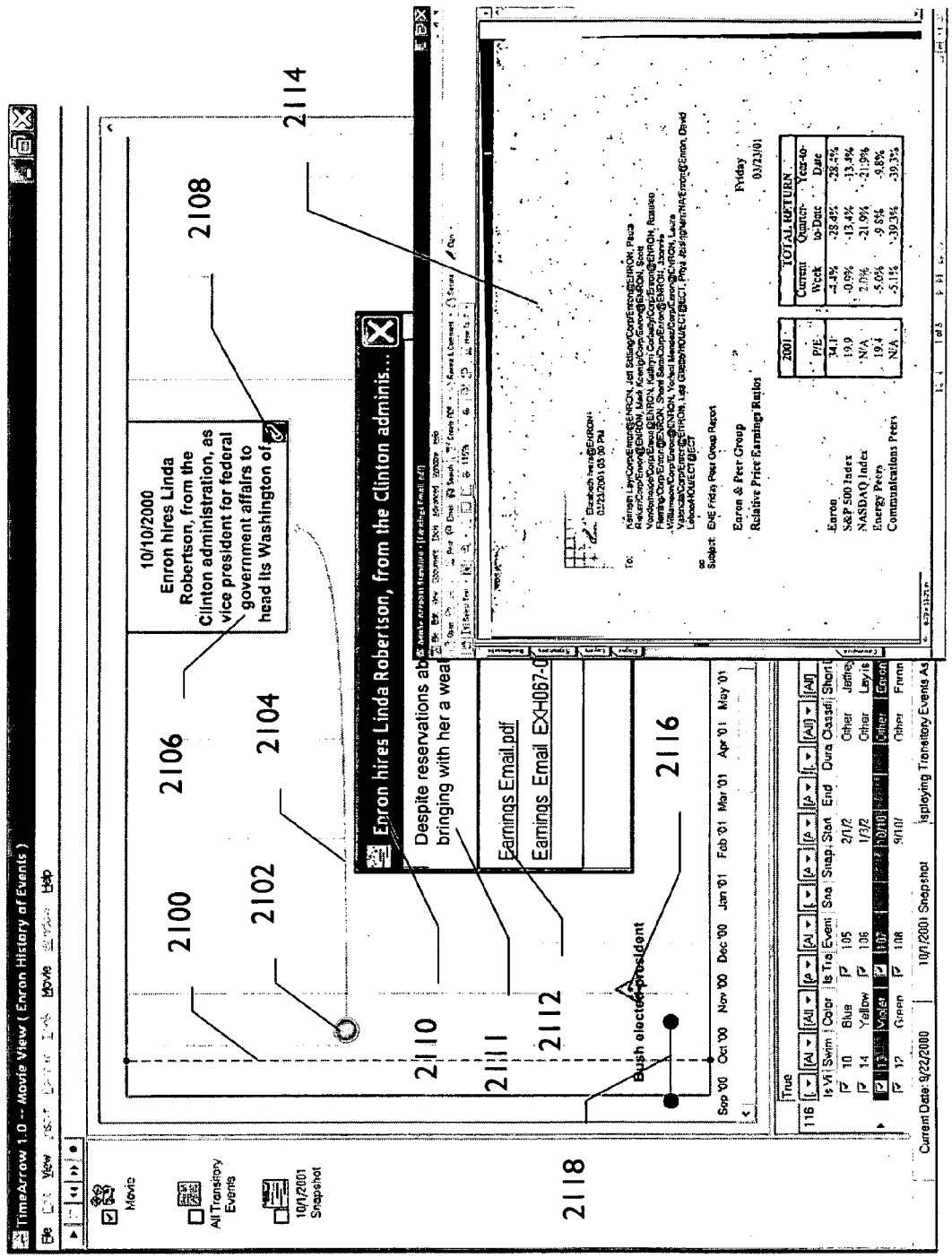

FIG. 21 is a screen shot showing a detailed investigation or "drill-down" into attachments associated with one Event while the Movie is paused.

Figure 22:
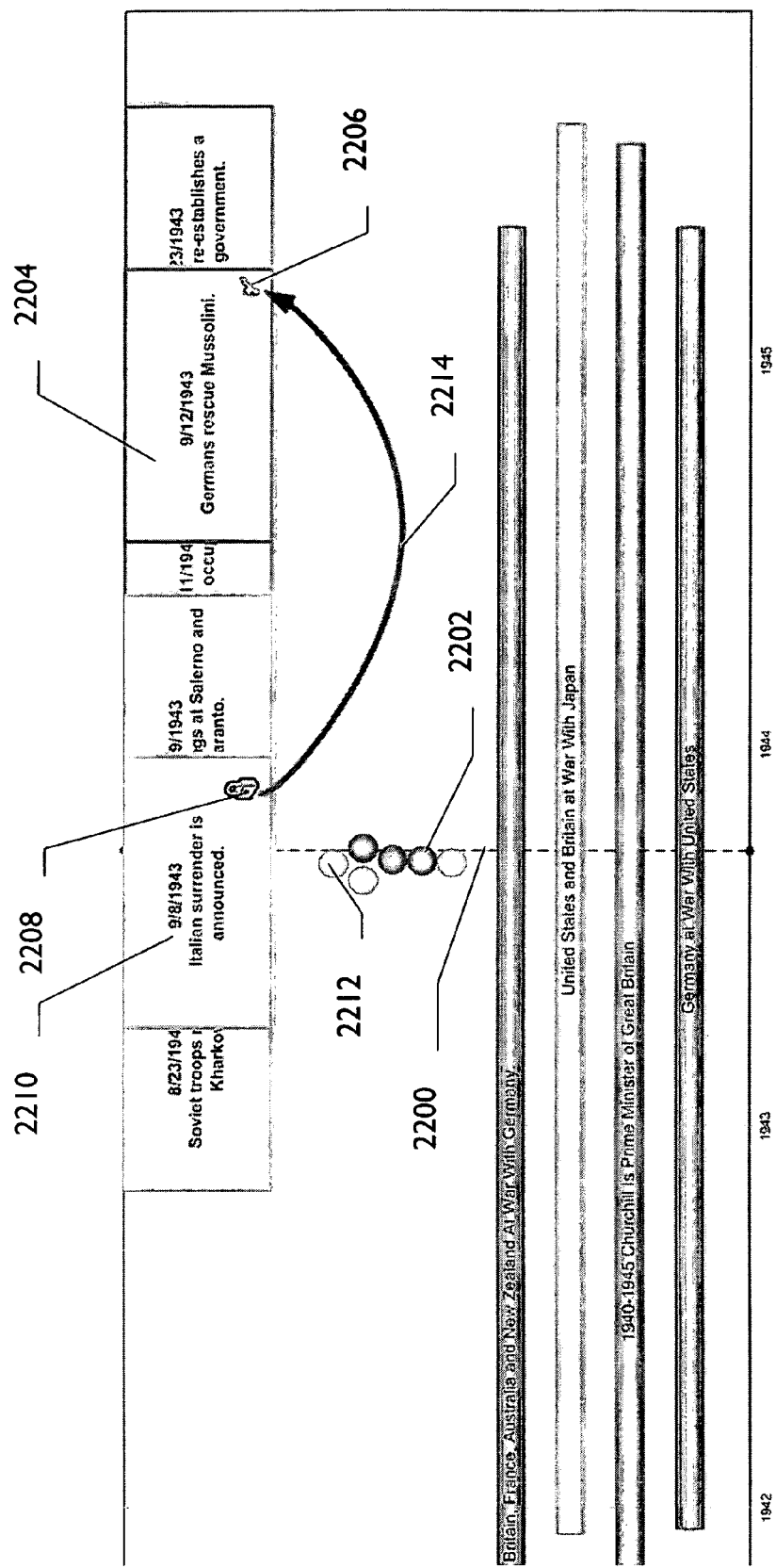

FIG. 22 is a screen shot showing the Auto-Display of purported Causal Dependencies between two Events while the Movie is running.

Figure 1:
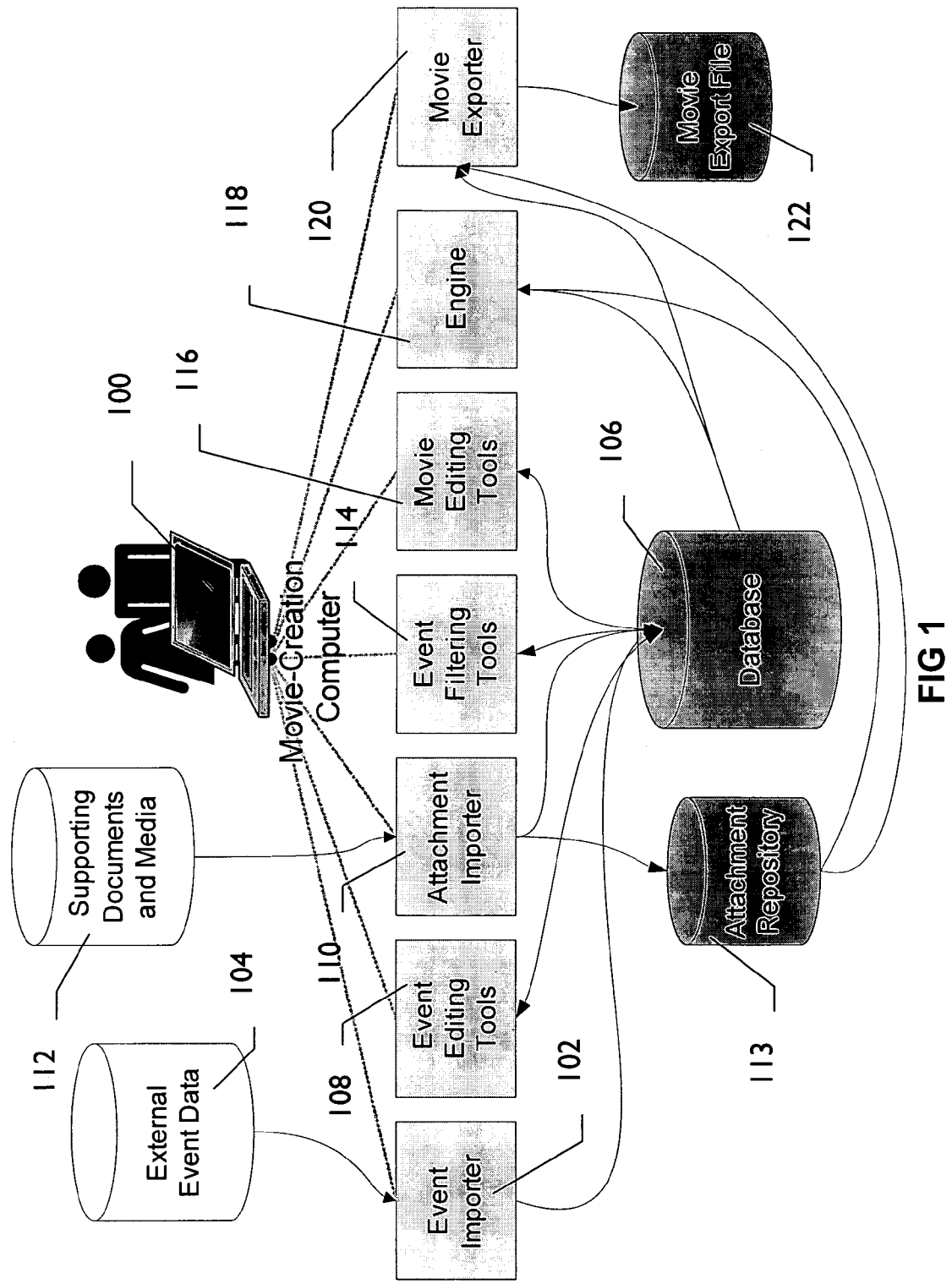
FIG. 1 is a perspective view of an embodiment of the Movie-Creation System of the invention, showing the overall steps to creating, viewing, and interacting with a Movie.
Figure 23:
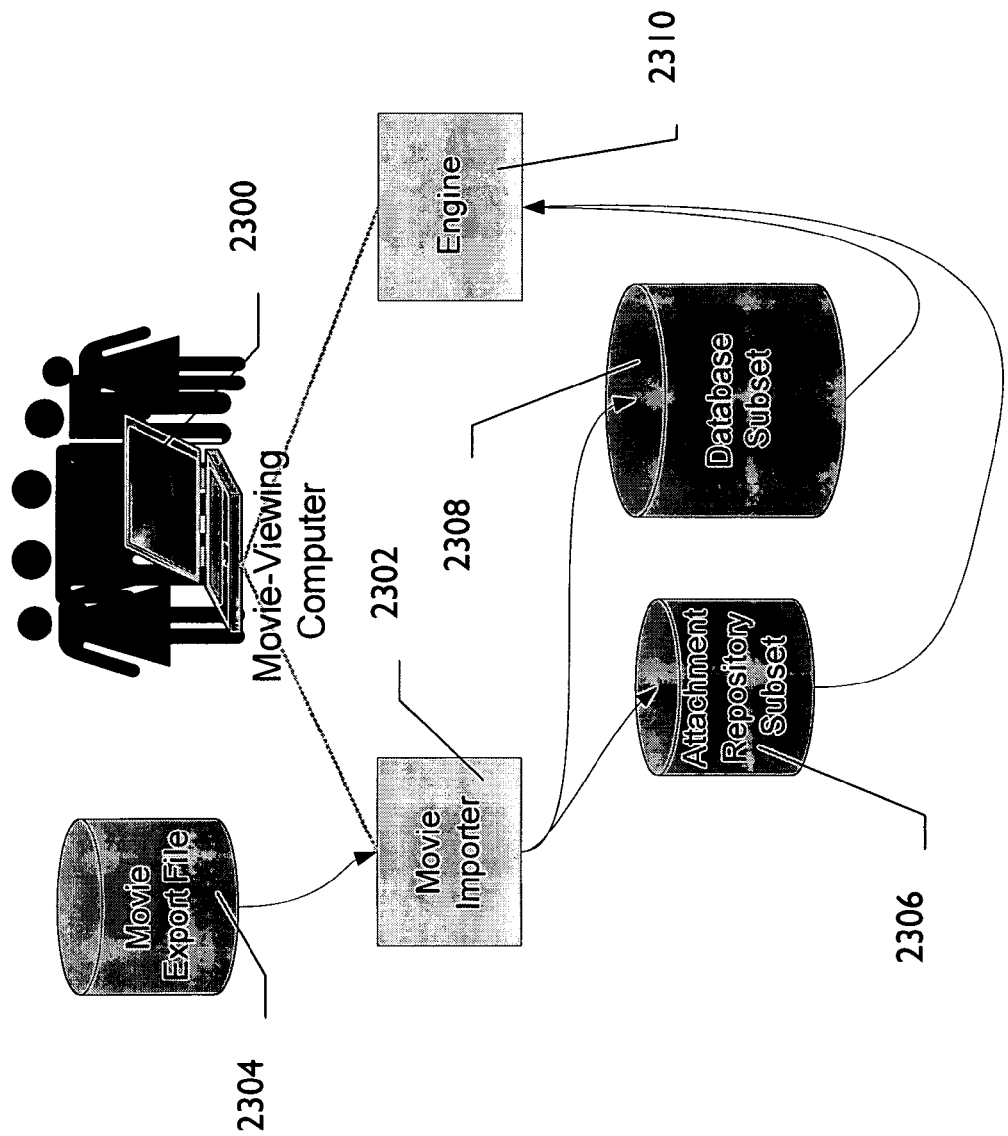

FIG. 23 is a perspective view of an embodiment of the invention showing the overall steps for viewing and interacting with a Movie that has been created with the Movie-Creation System of FIG. 1.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

GLOSSARY OF TERMS

The following definitions are intended as guides or illustrations regarding terms used in this specification, but are not intended to be limitations:

Attachment: any document, Web page, or other hyperlink that can be associated with an Event. Examples are an Excel spreadsheet, a Powerpoint presentation, a URL for a Website, or an Outlook email. Attachments can be viewed when the Movie is paused by double-clicking on an Event Marker with an attachment icon to see a list of attachments for that Event and then clicking on the hyperlink for the Attachment. Or Attachments can display automatically when the Engine displays an Event Marker if the Attachment is an Auto-Display Attachment.

Auto-Display Attachment: an Attachment that has been parameterized so that it will appear on the Graph whenever the Event to which it is attached is displayed. All other Attachments are displayed only when the Movie is not playing and the user "drills down" into an Event to explore its attachments.

Auto-Display Causal Dependency: a graphical representation that one Event has a purported Causal Dependency on another Event that has been parameterized so that the graphical representation will appear on the Graph whenever one of the Events is displayed. All other representations of Causal Dependencies are displayed only when the Movie is not playing and the user "drills down" into an Event to explore its purported Causal Dependencies.

Causal Dependency: A Dependency between two Events A and B in which the user has created a connection between A and B, with one of them being denoted by the user as the "cause" and the other being denoted as the "effect." For example, the user may connect Event A, "the power failed at 6:00 p.m. on July 10" with Event B, "the meat in the freezer was found to be spoiled when inspected at 4:00 p.m. on July 11."

Classification: user-defined category that classifies an Event (e.g. Testing, Milestone Achieved, Change of Scope, etc). This field is useful for filtering Events and for controlling how they appear in Movies.

Callout Box: box containing text that describes an Event. This box typically appears at the top of the movie screen. When the user pauses the movie and selects this box, the software draws a lead line between the Event Marker and the Callout Box. The border color of the Callout Box typically matches the color of the Event Marker. The Callout Box can also contain icons that indicate the presence of additional information such as Attachments, Dependencies, and detailed textual descriptions.

Cursor: vertical line that moves relative to the Timeline to indicate the passage of Time. The Cursor always has a Time associated with it, which we denote as Cursor Time.

Cursor Time: the Time associated with the current position of the Cursor along the Timeline.

Dependency: a relationship between two Events. A dependency can be one of two types: Temporal Dependency or Causal Dependency. See definitions of these two types elsewhere in this Glossary of Terms.

Drilldown Box: a dialog box on the screen that lists additional attributes of an Event that the user can explore. For example, a Drilldown box may list all the Attachments associated with an Event and/or it may list all Dependencies associated with an Event.

Engine: the software rules and procedures for displaying Event Markers and related information on the Graph based upon the Time position of the Cursor relative to the Timeline.

Event: something that either happened in the past, started in the past, or is a task in a plan. While it is preferred that the disclosed invention is particularly useful for reviewing things that happened or were commenced in the past, it is also contemplated that the term Event will encompass things planned for the future.

EventID: identifier for an Event. The combination of EventID and ProjectID must be unique across all data in the Database.

Extended Event: Event that occurs over a period of time. Such an Event may be represented in the Graph by a Gantt task bar, which is generally a rectangle with the left edge representing the StartTime and the right edge representing the EndTime.

Gantt Bar: a familiar Marker to represent Extended Events, especially those that are tasks in plans.

Global Values Data or values that apply to all imported rows during the import step.

Graph: graphical screen that displays the animated Movie that may be in motion or may be paused. The Graph contains, among other things, the Timeline, Cursor, Event Markers, Callout Boxes, Drilldown Boxes, lead lines, displayed Attachments, and Playback Controls.

Literal Snapshot: Snapshot that displays only those Persistent Events that are explicitly included in the SnapshotEvents table. The Times for each such Event are determined solely by the Time fields in the SnapshotEvent row for that Event and for that Snapshot and do not depend upon earlier Snapshots or other Events.

Main Grid: spreadsheet-like grid of cells that can display the fields for all Events in the Database, including all rows in SnapshotEvents and in BaseEvents. This grid contains Events for all Projects in the Database and all Snapshots for each project. Users can edit, add, and delete Events in this grid.

Mapping: an association between a field in the External Event Data and a field in the Database that allows the field in the External Event Data to become a field in the Database.

Marker: the symbol employed to represent an Event in a Movie. For example, Transitory Point Events may be represented by colored circular Markers, and Persistent Extended Events may be represented by colored rectangles (Gantt bars). The horizontal coordinates of a Marker relative to the Timeline convey the StartTime and EndTime of the Event that the Marker represents.

Movie: a collection of visible objects including Markers, Callout Boxes, Drilldown Boxes, and Attachments, combined with a Cursor, a Timeline, and various display settings to present an animated sequence of graphical displays that shows the occurrence of Events and the Dependencies among these Events. A movie can contain one or more Projects and can contain one or more Snapshots for each Project.

Movie Grid: spreadsheet-like grid of cells that appears below the Graph when a Movie is being viewed. Users can edit display characteristics of Events in this grid. For example, the user can edit each Event's visibility (IsVisible field), Swim Lane, and Color.

Persistent Event: Event that remains visible on the Graph even when the Time Window associated with the Cursor does not contain either the StartTime or the EndTime of the Event. A Persistent Event is associated with one or more Snapshots. The change from one Snapshot to the next as the Cursor moves causes animation of Persistent Events.

Playback Controls: buttons associated with the Graph that control the playback of the Movie. These controls allow the user to play, pause, single-step (forward/backward), stop, rewind, fast-forward, skip to beginning, skip to end, and capture a frame to an output file.

Point Event: Event that happens at one point in time and is represented by a Point-Event Marker (e.g. a circle) and a Callout Box. The Engine causes a Point Event to be animated by displaying a Point Event when its StartTime is contained in the Time Window that surrounds the Cursor and then erasing it after the Cursor moves to other Times.

Predecessor: Event on which another Event has a Temporal Dependency or a Causal Dependency. An Event's Predecessor Event for Temporal Dependencies constrains the StartTime and/or EndTime of the Event. An Event's Predecessor Event for Causal Dependencies has been connected to it by a user who judges that the Predecessor Event caused the Event to occur.

Project: collection of Transitory and/or Persistent Events. If a Project contains Persistent Events, then it may contain one or more Snapshots.

ProjectID: the unique identifier for a project.

Recursive Snapshot: Snapshot that displays all Persistent Events by default, whether or not they are in the SnapshotEvents for the Snapshot. The Engine computes the StartTime and EndTime for each Event by starting with the earliest Snapshot, applying Temporal Dependencies to constrain the StartTime and/or EndTime, and then recursively repeating this computation for the next Snapshot. Thus the only rows that need be included in the SnapshotEvents table for each Snapshot are rows for Events whose Times changed from the previous Snapshot and whose Times are not Temporally Dependent upon other Events.

Single-Step: (verb) to manually move the Cursor right or left by one increment of Time. Single stepping allows the user to progress through the Times of the movie at a speed that is convenient for studying Events at the user's own pace.

Snapshot: A Snapshot applies only to Persistent Events and represents a "version" of the Times for these Events. An example is a plan that changes. The Persistent Events are the tasks in the plan. Each change in the plan means different Times for these tasks and is represented by a different Snapshot of these Persistent Events. Thus, a Snapshot presents Markers representing the version of Persistent Events that is relevant to the position of the Cursor. FIGS. 19 and 20 show a Movie that has two Snapshots, illustrating how the Persistent Events represented by the Gantt bars 2006, 2008, 2010, 2012, 2014, and 2016 change their Time positions on the Graph as the Cursor moves from one Snapshot to the other Snapshot. As a Snapshot of Persistent Events is being displayed, the Transitory Events, such as Event 2016, that are relevant to the position of the Cursor are also being displayed. FIG. 17 shows a Movie containing only one Snapshot with four Persistent events represented by Gantt bars, one of which is the Persistent event 1705 representing the presence of Britain in World War II. Since there is just one Snapshot, these Persistent Events do not move to different Time positions as the Cursor moves. Instead they remain on the screen as background Markers upon which the Transitory Events, illustrated by the Transitory Event markers 1712, appear and disappear as the Cursor moves.

SnapshotID: a key that uniquely identifies a Snapshot in the Database.

Snapshot Number: the unique identifier for a Snapshot within a Project.

Snapshot Interval: Time interval during which the Engine will display Persistent-Event Times corresponding to the Snapshot. To compute the Snapshot Interval, the Engine first creates a list of Snapshots for one Project and orders the list based on increasing Snapshot Times. The Snapshot Interval for a given Snapshot begins at that Snapshot's Snapshot Time and ends at the Snapshot Time for the next Snapshot in the list. If there is no next Snapshot in the list then the Snapshot Interval extends to arbitrary times greater than the Snapshot Time.

Snapshot Time: the Time at which Snapshot becomes effective for a Project. As the Cursor moves, the Engine will display the Snapshot with the latest Snapshot Time that is less than the Cursor Time.

Swim Lane: a horizontal lane on the Graph that holds Events as the movie plays. A Swim Lane is determined by its vertical distance from the Timeline. Users employ Swim Lanes to distinguish among different types of Events. (See "Track")

Temporal Dependency: A dependency between two Events A and B in which the StartTime or EndTime of Event A is constrained (typically in a plan) by the StartTime or EndTime of Event B. For example Event A cannot start until Event B has completed because Event B produces a deliverable that is a prerequisite for A to begin.

Time Sample: The Time interval by which the Cursor Time changes when the user Single-Steps the Movie. Time Sample is also the interval between Times at which the Engine can display a different set of Transitory Events. In other words, the Cursor can move in Time at smaller increments than Time sample in order to make the Cursor movement smooth in appearance, but the set of Transitory Events on the Graph will change only when the Cursor has moved in Time by the amount Time Sample.

Track: a horizontal lane that holds Events as the movie plays. (synonym for "Swim Lane")

TimeLine: a linear time scale on the Graph showing monotonically-ordered times that serve as reference points as the Cursor moves in Time. A TimeLine will normally be subdivided into smaller units showing successive tick marks that indicate successive years, quarters, months, weeks, days, hours, minutes, or seconds.

Time Window: a time range containing the Cursor Time and determining which Transitory Events appear on the Graph. The Time Window extends from T−T_LEFT to T+T_RIGHT, where T is the Cursor Time, T_LEFT is the trailing extent of the time window, and T_RIGHT is the leading extent of the Time Window. A Transitory Event appears on the screen if either its StartTime or its EndTime is contained in the Time Window.

Transitory Event: an Event that becomes visible when the Cursor gets near it and then disappears after the Cursor moves away from it. Its appearance and disappearance is determined by its Time relative to the Timeline and by the Time Window surrounding the Cursor, which moves relative to the Timeline.

UniqueEventID: a key that uniquely identifies an Event in the Database.

Given the central importance of the Event in this invention, the following table summarizes the Event classifications of Point/Extended and Transitory/Persistent:

| Event Types | Transitory | Persistent |
|---|---|---|
| Point | Appears in Graph when the Time Window associated with the Cursor contains the Event's StartTime (which equals its EndTime). Disappears after the Time Window no longer contains the Event's StartTime. Represented by a Transitory Point-Event Marker (e.g. a colored circle) and by an | Remains visible in Graph regardless of Cursor Time. May change attributes (e.g. it StartTime, SwimLane, color, . . . ) whenever the Cursor moves from one Snapshot Interval to the next Snapshot Interval. Represented by a Persistent Point-Event Marker (e.g. by a colored triangle) |

| Event Types | Transitory | Persistent |
|---|---|---|
| | associated Callout Box. | |
| Extended | Appears in Graph when the Time Window associated with the Cursor contains either the Event's StartTime or its EndTime. Disappears after the Time Window no longer contains Event's StartTime or EndTime. Represented by Extended-Event Marker (e.g. by a colored Gantt rectangle). | Remains visible in Graph regardless of Cursor Time. May change attributes (e.g. StartTime, EndTime, Swim Lane, color, . . . ) whenever the Cursor moves from one Snapshot Interval to the next Snapshot Interval. Represented by a Persistent Extended-Event Marker (e.g. by a colored Gantt rectangle) |

It will be understood that disclosed here is a computer-implemented system that is used to create animated presentations of Events and a computer-implemented system for disseminating, viewing, and interacting with the animated presentations that have been created with the disclosed system.

Turning now to FIG. 1 it will be understood that the first part of the invention, the Movie-Creation System, which allows a user to create animated presentations on the Movie-Creation Computer 100, has been illustrated. In FIG. 1 the sequence of software workflow steps is from left to right and is described here.

Event Importer 102

Figure 2:
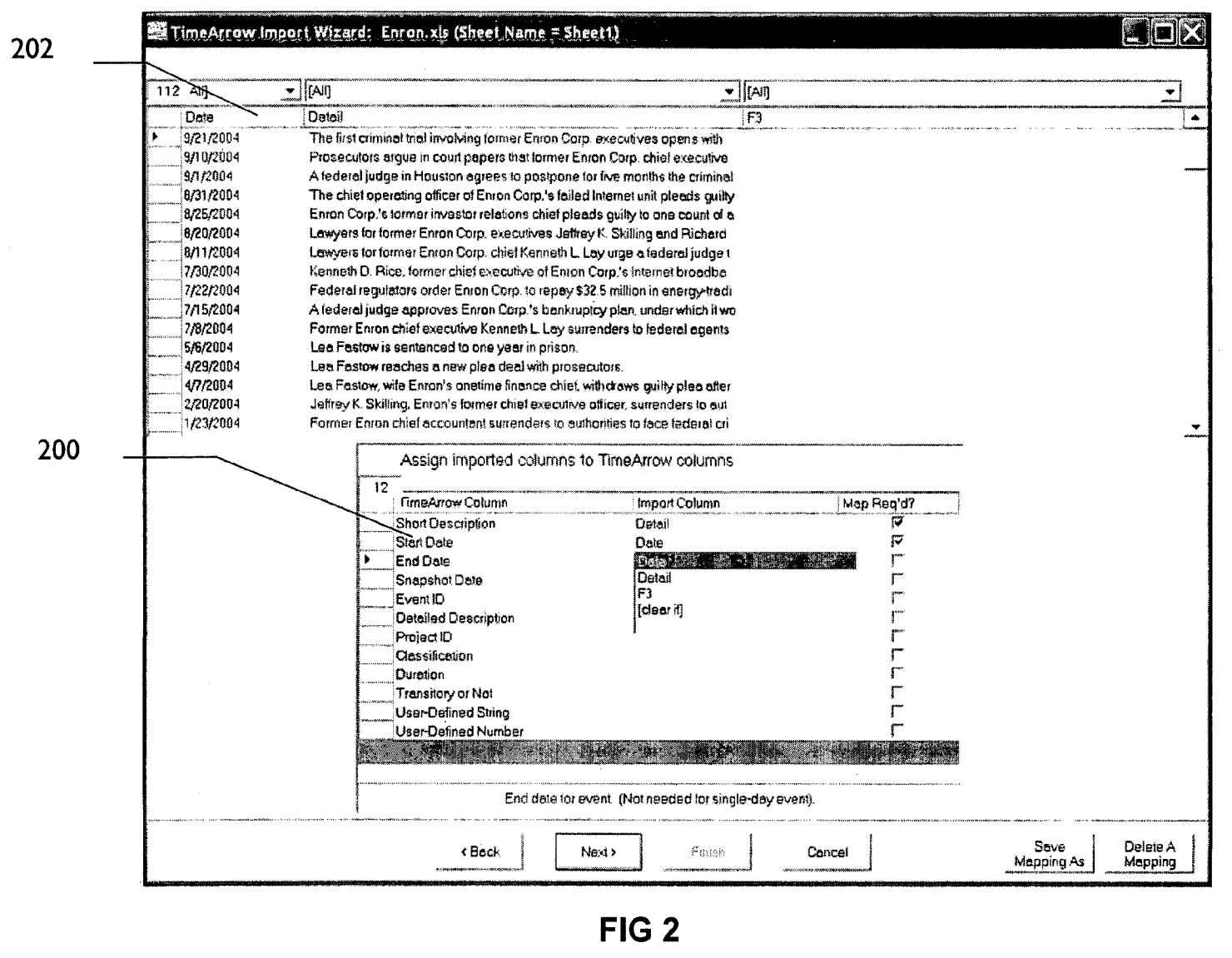

Generally the first step is using the Event Importer 102 to import Event data from External Event Data 104, although omission of this step is possible if the user chooses to enter all data manually. The imported data is stored in the Database 106. An example screen from an implementation of the import method is shown in FIG. 2. During this step, certain fields 200, or data input locations, in the Database 106 must be mapped to fields 202 in the External Event Data 104. In this example the field "Date" from the External Event Data 104 is being mapped to the field StartDate (which is synonymous with StartTime) in the Database 106. Other fields in the Database 106 must either be mapped or must be supplied with Global Values by the user. Still other fields may be mapped at the user's option. According to a preferred example of the invention, these general mapping rules are enforced, with the user alerted to violations of these rules so that corrections can be made.

External Event Data 104

This invention component refers to any source of historical Event data that serves as a source of imported data to load the Database 106 in the disclosed system. Examples of these sources include a Microsoft Office® Enterprise Project Management Database, a Microsoft Office® Project file, an Microsoft Office® Excel file, a Microsoft Office® Outlook file, Microsoft Windows® folder, an XML file, and a "flat file" of text. At a minimum, Event data consists of the following data pair: (Time, ShortDescription), where ShortDescription is a brief textual description of the Event. A more complete schema, or rules for the data regarding an Event, follows.

Database 106

As the user loads data from external sources into the fields 200, the data is mapped, or arranged, into fields of the Database 106.

Figure 3:
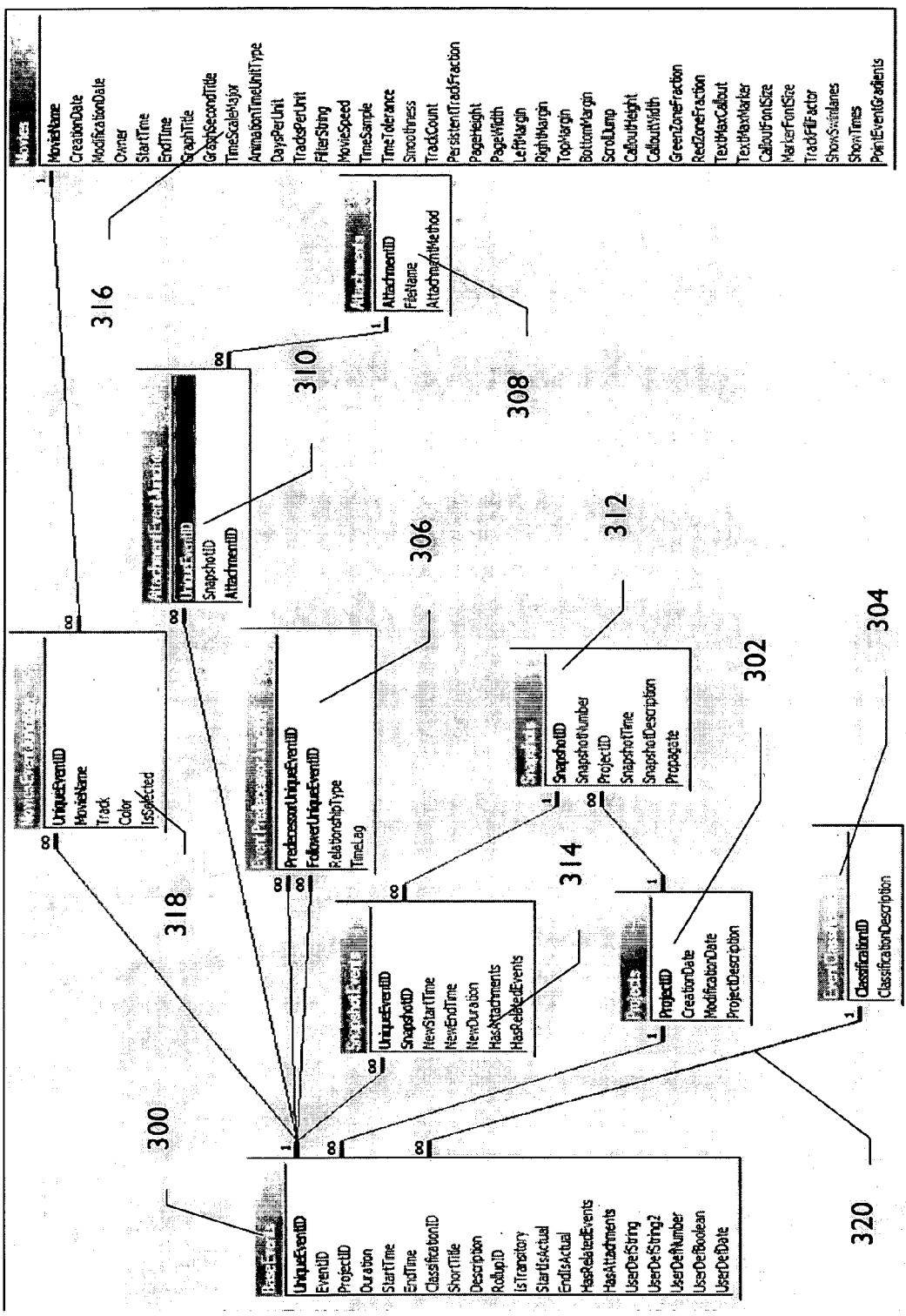
FIG. 3 is the schema of the Database in the highly preferred implementation.

The Database's schema and its physical implementation is the basis for all import, editing, filtering, Movie-creation, Movie-viewing, and Movie-interaction activities. FIG. 3 shows a preferred implementation of the schema for the Database 106 that encompasses the tables: BaseEvents 300, Projects 302, EventClassifications 304, EventPredecessorJunction 306, Attachments 308, AttachmentEventJunction 310, Snapshots 312, SnapshotEvents 314, Movies 316, and MoviesEventJunction 318. FIG. 3 also shows the important one-to-many relationships among the tables, which are indicated by lines 320 that have a "1" on one end (the "one" end) and an infinity symbol "∞" on the other end (the "many" end). This means that one row in the table at the "one" end can be in relationship with many rows in the table at the "many" end. The tables in this schema of FIG. 3 are as follows:

BaseEvents Table 300

Events are the objects that are animated, visualized, and explored by the users of this invention. Each Event represents something that either happened in the past or is a task in a plan. Each Event has a set of fields that are available to the user for making Movies. FIG. 4 lists such fields and gives the data representation of each such field. Additional detail on many of these fields is given in the Glossary of Terms above. The primary key of this table is UniqueEventID.

Projects Table 302

This table contains attributes that describe each Project in the Database. FIG. 5 lists the fields of this table and gives the data representation of each such field. The primary key of this table is ProjectID.

EventClassifications Table 304

This table contains classifications that can be associated with Events to enable specific types of Events to have specific Markers, colors, or Swim Lanes. FIG. 6 lists the fields of this table and gives the data representation of each such field. The primary key of this table is ClassificationID.

EventPredecessorJunction Table 306

Each row of this junction table establishes a Dependency (either a Temporal Dependency or a Causal Dependency, depending on the value of the field RelationshipType) between two Events. FIG. 7 lists the fields of this table and gives the data representation of each such field. This table has two foreign keys, PredecessorUniqueEventID and FollowerUniqueEventID, both of which refer back to the UniqueEventID in the BaseEvents table 300. The TimeLag field applies only to Temporal Dependencies and gives the amount of time by which the follower Event is delayed with respect to the predecessor Event.

Attachments Table 308

This table stores references to all Attachments for all Events in the Database 106. Each attachment can be either a file or a URL that points to a Web site. FIG. 8 lists the fields of this table and gives the data representation of each such field. Its primary key is AttachmentID.

AttachmentEventsJunction Table 310

This junction table establishes associations between Events and Attachments, using the foreign key UniqueEventID from the BaseEvents table 300 and the foreign key AttachmentID from the Attachments table 308. FIG. 9 lists the fields of this table and gives the data representation of each such field.

Snapshots Table 312

A Snapshot stores the Times of Persistent Events during intervals and belongs to one and only one Project. These intervals are called Snapshot Intervals and are defined by the set of Snapshot Times for each Snapshot in the Project. In each Snapshot, the StartTime, Duration, and/or EndTime of each Persistent Event can change. Other Event attributes can also change, such as the existence of an Attachment or of a Causal Dependency. The Engine uses the Snapshot Interval and the Cursor Time to determine which Snapshot to display, and this causes Persistent Events to change as the Cursor moves, yielding one type of animation in this invention. FIG. 10 lists the fields of this table and gives the data representation of each such field. The primary key of this table is SnapshotID. Additional detail on some of these fields is given in the Glossary of Terms above and in the additional description below.

There are two types of Snapshots: "Literal" and "Recursive," which differ in how the Times for each Persistent Event are calculated and how the user includes Persistent Events in a Snapshot. Each Snapshot is marked by a flag, the Propagate field, that tells the software which type it is. If the Propagate field equals TRUE, then the Snapshot is Recursive. If the Propagate field equals FALSE, then the Snapshot is Literal. Here is a brief overview of these two types of Snapshots:

Literal Snapshot: If a Persistent Event is omitted from a Literal Snapshot, it will not be displayed when that Snapshot is displayed. Times for a Persistent Event are completely determined by its Time fields in that SnapshotEventTable (e.g. NewStartTime, NewEndTime, and NewDuration). The Times do not depend upon Times in other Snapshots, nor do the Times depend on other Events. In other words, each Persistent Event in a Literal Snapshot is displayed in that Literal Snapshot with the literal Times that are specified for it there, regardless of earlier Snapshots or other Events.

Recursive Snapshot If a Persistent Event is omitted from a Recursive Snapshot, the default is to display the Event as long as it appears in the earliest Snapshot. The Engine computes Times for each Persistent Event by starting with the earliest Snapshot, applying all Temporal Dependencies, and then recursively moving forward in Time to the next Snapshot. The Times for a Persistent Event in the previous Snapshot are default Times for it in the current Snapshot unless something changes for that Event or for an Event on which it has a Temporal Dependency. In other words, each Persistent Event is displayed in a Snapshot with a Time that is recursively constructed from all previous Snapshots and from all other Events upon which it is dependent. Only those Persistent Events with Times or durations that change from the previous Snapshot must be explicitly included as rows in the SnapshotEvents table 314 for a Recursive Snapshot. The Engine generates all the Times for all other Persistent Events from previous Snapshots and from Temporal Dependencies as described above.

SnapshotEvents Table 314

This table applies only to Persistent Events and specifies independent changes in Persistent Events from Snapshot to Snapshot. FIG. 11 lists the fields of this table and gives the data representation of each such field. The primary key for this table is the combination of UniqueEventID and SnapshotID. Note that this table has a foreign key UniqueEventID that refers back to the BaseEvents table 300 and another foreign key SnapshotID that refers back to the Snapshots table 312. The fields NewStartTime, NewEndTime, NewDuration, HasAttachments, and HasRelatedEvents allow an Event to differ from its "parent" Event in the BaseEvents table 300. In other words, the SnapshotEvents table 314 can be thought of as a "difference table" to allow Persistent Events to vary from Snapshot to Snapshot in the Project.

Movies Table 316

The Movies table 316 is the repository for information that applies to all Events in a Movie, such as scales, font sizes, Time Window size (specified as Time Tolerance in FIG. 12), titles, playback speed, Time Sample, etc. FIG. 12 lists the fields of this table and gives the data representation of each such field. The primary key of this table is MovieName.

MoviesEventJunction Table 318

Each row in this table describes the Movie-related attributes that are specific to one Event appearing in one Movie. Thus this table has two foreign keys: UniqueEventID points back to the BaseEvents table 300 to identify the Event; MovieName points back to the Movies table 316 to identify the Movie. The other fields describe some attribute of the specific Event when it appears in the specific Movie. For example, one field (Track) describes the Swim Lane that each Event occupies in a Movie, another (Color) describes the color of the Event's Marker, and another (IsSelected) tells whether the Event is visible in the Movie. FIG. 13 lists all the fields of this table and gives the data representation of each field.

Event Editing Tools 108

Having completed the description of the schema for the Database 106 as it is being filled, we now return to FIG. 1 to continue the overall flow of steps in the Movie-Creation System of this invention. Once the Database 106 has been populated, or filled, with data from the External Event Data 104, the next step is for the user to optionally add new data, delete data, or edit existing data. This is shown in FIG. 1 as application of Event Editing Tools 108. A preferred implementation of this step is shown in FIG. 14, which shows the Main Grid 1400, a spreadsheet-like grid of cells that allows the user to edit the Event fields in a familiar fashion. Each row represents an Event from the Database 106. For example, row 1401 represents a Transitory Event, and row 1402 represents a Persistent Event. Each Transitory Event occurs just once in the Main Grid 1400 of FIG. 14, but each Persistent Event will occur once for each row that it has in the SnapshotEvents table 314. In addition to being able to edit fields in these rows of the Main Grid 1400, the user can also add new Events by adding new rows to the Main Grid 1400 and can delete Events by deleting rows from the Main Grid 1400. For the case of Persistent Events, the user can also add, edit, or delete instances of a Persistent Event to/from a Snapshot.

Attachment Importer 110

The disclosed Movie-Creation System also allows a user to attach files, documents or Web links to Events. For example media files such as photographs or sound recordings may be attached to Events, to be browsed when the user pauses the Movie or to be automatically activated when the Event is displayed as the Movie plays. Other examples of attachments include digital video clips, PowerPoint slides, Excel spreadsheets, Web pages, Outlook e-mails, and so on. The existence of such attachments is indicated to the user by an icon on the Event Marker or Callout Box. A "paperclip icon" is used in the examples of this invention. This Attachment Importer step 110 may be accomplished by having the user first select an Event to which an attachment will be made. The user then browses the computer, the local network, or the Web for Supporting Documents and Media 112 to attach to the Event. The user's decision to attach such material results in filenames and/or URLs from the Supporting Documents and Media 112 being placed in association with the Event via the Attachments table 308 and the AttachmentsEventJunction table 310. The Attachment files from the Supporting Documents and Media 112 are copied to the Attachment Repository 113, where they are stored so that they can be reliably accessed as the Movie is being played. A less reliable method is to simply store links to the files in the Attachment Repository 113, which runs the risk that the files have been moved or deleted when the user plays the Movie. Attachment URLs are simply stored in the Attachments table 308.

Event Filtering Tools 114

Once the Event Importer 102, the Event Editing Tools 108 and the Attachment Importer 110 are completed, the next step is for the user to filter the Database 106 to select those Events that the user wants to include in the Movie. This is shown as the application of Event Filtering Tools 114 in FIG. 1. According to a preferred embodiment of the invention, the user is able to filter Events on one or more columns of the BaseEvents table 300 and of the SnapshotEvents table 314, which appear as column headings of the Main Grid 1400 in FIG. 14. A filter box 1404 appears at the top of each column of the Main Grid in FIG. 14. Each such filter box contains a list of all the values that appear in its column, allowing the user to filter the Main Grid 1400 to show only those rows that have one specific value in that column. For example the user could choose to filter the Main Grid 1400 so that only those rows with Snapshot Number=0 would pass the filter and be displayed in Main Grid. The user could then employ a "logical AND" operation to combine this Snapshot-Number filter with a filter for another column, such as the HasAttachments column. If the user chooses HasAttachments=TRUE, then Main Grid would display only those rows corresponding to Events that have attachments and belong to SnapshotNumber 0. This process can continue, using "logical AND" operations to combine filters for additional columns with the existing set of filters.

In addition, the invention allows the user to perform advanced (multi-condition) filtering operations on each column, as is shown in FIG. 15. In this example, the ProjectID column is being filtered to match two conditions connected by a logical OR operation: ProjectID=WWIIPersistent OR ProjectID=WWIITransitory. FIG. 15 demonstrates an implementation in which each column can have up to three conditions connected by logical AND or logical OR operations. The filtering for each column can then be combined with filters for any of the other columns in the Main Grid 1400.

Once the user has filtered the Events to select those Events to include in the Movie, the user selects the "Make Movie From Main Grid" command from the application menu to instruct the software to create a Movie consisting of the Events that pass the set of filters.

Movie Editing Tools 116

After the user has filtered a set of Events for inclusion in a Movie and commands that a Movie be created, the next step is for the software to assign default properties for the appearance of the Markers for the Events in the Movie. Such Marker properties include font sizes, Marker sizes, Marker colors, percent of Swim Lanes allocated to Persistent-Events Markers, etc. The user can then edit Movie properties for each Event, as implemented by the MoviesEventJunction table 318, to achieve the desired analysis and communication goals of the Movie. The screenshot of FIG. 16 shows an implementation of the default part of this editing step, in which the user is specifying default properties of the Movie (e.g. number of Swim Lanes, percent Persistent Swim Lanes, Time Window, etc.). One implementation of the default assignment of properties is to assign each Event Marker to a Swim Lane and a color based on random mappings of its Time to a finite set of colors and a finite set of Swim Lanes. Once the properties such as color and Swim Lane have been assigned default values, the user can modify these properties. The Movie Grid 1700 in the lower part of FIG. 17 shows how the individual Movie properties for each Event are made visible to the user so that the user can edit them in familiar grid fashion. Note for example that there are now columns for visibility 1701, for Swim Lane 1702, and for Marker color 1704. These Event-specific Movie attributes can all be edited in the Movie Grid 1700 cells. Alternatively they can be edited by right-clicking on any Event Marker 1705 in the Graph shown in FIG. 17 to bring up a context menu that allows the user to change attributes in the MoviesEventJunction table 318.

Engine 118

An important part of the Movie Creation System is reviewing the Movie and making changes to the Movie until it is deemed satisfactory to the user who is creating the Movie. The Engine 118 is the system that sequences what appears on the screen as the Movie is being played, while the Movie is being Single-Stepped forward or backward by the user, while the user is dragging the Cursor to a new Time, or while the user is exploring an Event in more detail while the Movie is paused or stopped. In order to review a Movie, it is necessary to advance the Movie using the Engine 118 that causes the following steps to occur:

Movement of the Cursor left or right relative to the underlying Timeline, each movement occurring automatically under control of a timer or manually as the user single-steps the Movie;

Display of any Transitory Event whose StartTime or EndTime are contained in the Time Window that moves with the Cursor, changing this display when the Cursor Time has moved by the amount Time Sample;

Display of the Current Snapshot of any Persistent Events, the Current Snapshot being that Snapshot whose Snapshot Interval currently contains the Cursor Time;

Propagation of any Temporal Dependencies for the current Snapshot, updating the Time of each Persistent Event that has Temporal Dependencies on other Events.

Display of any Auto-Display Attachments or of any Auto-Display Dependencies associated with any displayed Transitory Events or with any Persistent Events of the current Snapshot. The display of an Auto-Display Dependency can cause a Transitory Event to appear on the Graph when it would not normally appear under the rules in Step 2.

When the Movie is paused or stopped, display of the Drilldown Box for any Event that possesses a Drilldown Box and that the user has selected for drilldown.

When the Movie is paused or stopped and the Drilldown Box is displayed, display of Attachments or Dependencies that are listed in the Drilldown Box.

To illustrate step 2 above, an example Graph display from an implementation of the Engine is shown in the screen-shot of FIG. 17, where the Movie Graph contains the moving Cursor 1706 that moves along the Timeline 1708. Note that the Time Window 1710 does not actually appear on the Graph but is drawn here to show how it determines the set of five Transitory Point Events 1712 that are displayed. Also note the "VCR Controls" 1714 that the user can employ to play, pause, stop, single-step, skip-to-beginning, skip-to-end, fast-forward, or rewind the Movie. Using these controls to move the Cursor to a later Time in FIG. 18, note that that the Cursor 1800 has moved to the right, dragging the Time Window 1802 with it and causing a different set of three Transitory Point Events 1804 to be displayed. This "moving time-window" selective display of Transitory Events gives the invention some of its animation capability and allows it to display large numbers of Transitory Events without cluttering up the Graph. Note also that the hiding of Transitory Events that no longer are in the Time Window may be delayed until the next set of Transitory Events is displayed, so that something "interesting" stays on the Graph.

The screen-shot of FIG. 18 also illustrates the use of a lead line 1806 to associate the Event's Marker 1808 with the Callout Box 1810 containing specific information about the Event, such as its StartTime and its ShortDescription. FIG. 18 also illustrates the display of several Persistent Extended Events 1812 and 1814, which are displayed by the Engine even though their StartTimes and EndTimes are not contained inside the Time Window 1802. Finally FIG. 18 illustrates the use of Swim Lanes, which are rectangles that extend from left to right across the Graph at various heights above the TimeLine 1816. An Event Marker must always be inside one and only one Swim Lane. For example the Persistent Extended Event 1812 has Swim Lane 1818 as its Swim Lane, and Swim Lane 1818 is the fourth Swim Lane counting upward from the TimeLine 1816. Note that the rectangle in FIG. 18 that illustrates SwimLane 1818 may not normally appear in the Graph, but is shown here for illustrative purposes.

The two successive Movie Graph displays of FIG. 19 and FIG. 20 illustrate Step 3 and 4 above: how the moving Cursor leads to different attributes (e.g. different StartTimes and EndTimes) of Persistent Events being displayed in the Graph. In FIG. 19 the Cursor 1900 is located in the Snapshot Interval 1902 associated with the Snapshot whose Snapshot Time is Oct. 13, 2005. Note that the Snapshot Interval 1902 does not normally appear on the Graph but is drawn here to illustrate the definition and use of the Snapshot Interval. In FIG. 19 there is one Transitory Event Marker 1904 and associated Callout Box 1906 on the Graph, but the remaining Event Markers 1908 are the rectangular (Gantt) Markers for a set of six Persistent Extended Events. FIG. 20 shows how the Engine 118 changes the Graph when the Time Cursor 2000 moves from Cursor Time Nov. 16, 2005, which is in the Snapshot Interval 2002 for the Oct. 13, 2005 Snapshot, to Cursor Time Nov. 20, 2005, which is in the Snapshot Interval 2004 for the Nov. 17, 2005 Snapshot. Whereas the Persistent Event 2006 has not changed as the Cursor 2000 moves from the Oct. 13, 2005 Snapshot to the Nov. 17, 2005 Snapshot, the other Persistent Events have new StartTimes and/or EndTimes. The Engine 118 has executed the following steps in changing these Markers in the Graph as the Cursor Time has changed from Nov. 16, 2005 to Nov. 20, 2005: Looked up in the SnapshotEvents table 314 to find that Persistent Event 2008 has a new EndTime (NewEndTime) associated with the Nov. 17, 2005 Snapshot.

Propagated the Temporal Dependency of Event 2010's EndTime upon Event 2008's EndTime (these two Events have a "Finish-to-Finish" dependency), thereby pushing the EndTime of Event 2010 to a later Time.

Propagated the Temporal Dependency of Event 2012's EndTime upon Event 2010's EndTime (these two Events have an "Finish-to-Finish" dependency and Event 2012 has fixed duration), thereby pushing both the StartTime and the EndTime of Event 2012 to later Times.

Propagated the Temporal Dependency of Event 2014 upon Event 2012 (these two Events have a "Start-to-Finish" dependency and Event 2014 has fixed Duration), thereby pushing both the StartTime and the EndTime of Event 2014 to later Times.

Redisplayed all the Persistent Events at their StartTimes and EndTimes for the Nov. 17, 2005 Snapshot. Note that other attributes of the Persistent Events could also change as a result of the change from one Snapshot to the next. These other attributes include the color of the Marker, the type of Marker used, the Swim Lane, the icons showing the existence of Attachments, the icons showing Dependencies, etc.

Displayed each Transitory Event whose StartTime or EndTime is contained in the Time Window associated with the Cursor. In the case of FIG. 19 and FIG. 20, the same Transitory Event Marker 1904 that appears in FIG. 19 also appears as Transitory Event Marker 2016 in FIG. 20, since this Event's Time remains in both Time Window 1910 associated with Cursor position 1900 in FIG. 19 and in Time Window 2018 associated with Cursor position 2000 in FIG. 20.

Displayed a list of icons 2020 representing the entire sequential set of Snapshots that pertain to the Movie being displayed and optionally highlighted the Nov. 17, 2005 Snapshot as the current Snapshot.

FIG. 21 and FIG. 22 illustrate important aspects of Steps 5, 6, and 7 carried out by the Engine 118. In FIG. 21 the Cursor position 2100 has caused the Marker 2102 for a Transitory Point Event to be displayed, including its lead line 2104 that connects to its Callout Box 2106. Contained in the Callout Box 2106 is an "Attachment Icon" 2108 that indicates that the Event has Attachments. When the Movie is paused or stopped, the user can select either the Marker 2102 or the Callout Box 2106 and launch the Drilldown Box 2110, which contains additional information about the Event's Attachments and Dependencies and also may contain detailed textual information about the Event (e.g. the Description field of FIG. 4). The latter information appears in the text area 2111. In the example of FIG. 21, the Drilldown Box 2110 contains not only detailed text but also two hyperlinks to Attachments. One of these hyperlinks 2112 refers to an Adobe® PDF file named "Earnings Email.pdf". When the user clicks on this hyperlink 2112, the Engine 118 brings up the application window 2114 associated with the hyperlinked file, which is this case is a window for an application that can display an Adobe® PDF file. If this Attachment has been parameterized as an Auto-Display Attachment, then the Engine 118 will display the application window 2114 on the Graph as soon as the Engine 118 displays the Marker 2102 for the Event and will not invoke the Drilldown box 2110. Also note that FIG. 21 illustrates how the Engine 118 displays a triangle Marker 2116 for a Persistent Point Event, which remains displayed on the Graph even when the StartTime for this Event is outside of the Time Window 2118 that moves with the Cursor 2100.

FIG. 22 shows Steps 5, 6, and 7 for Dependencies. In this case, the Dependency is a Causal Dependency between two Transitory Point Events. With the Cursor 2200 in position to cause the Engine 118 to display six Transitory Point Events and four Persistent Extended Events, the Transitory Event with Marker 2202 has an Auto-Display Causal Dependency. This means that the Callout Box 2204 for this Event Marker 2202 displays a Causal Dependency Icon 2206, which is matched by a second Causal Dependency Icon 2208 in the Callout Box 2210 that corresponds to the causative Event with Event Marker 2212. The cause-effect relationship is also graphically indicated by the lead line 2214 that connects the "cause" icon 2208 with the "effect" icon 2206. The display in FIG. 22 appears as the Cursor moves relative to the Timeline. A similar display would also appear if the Movie were paused or stopped and the user selected one of the Markers 2202 or 2212 and brought up a Drilldown Box 2110 as in FIG. 21, allowing the user to explore Dependencies related to a selected Event 2210.

Finally, we note that the above description of animated Event playback relies upon the relative motion of the Cursor 1800 and the Timeline 1816 as shown in FIG. 18. Up until this point, to make our description easier to understand, we have spoken of an implementation of the invention in which the Timeline remains stationary on the screen and the Cursor moves. For example the Cursor moves left to represent increasing Time. It is clear, however, that an equivalent way to produce the same relative motion of Cursor and Timeline is to hold the Cursor 1800 stationary and move the Timeline 1816 to the left to indicate increasing Time. In this case, the Event Markers would also move to the left with the Timeline since an Event's Time is always displayed relative to the Timeline.

This alternative way to implement the actions of the Engine displays Markers, Callout Boxes, lead lines, Drilldown Boxes, and Attachments according to the same processes and rules that we have described above. Some users may prefer a stationary Cursor while others may prefer a stationary Timeline. Thus the preferred embodiment of invention contains a user-selectable software switch that determines which of these two modes is employed:
stationary Timeline and Markers with moving Cursor, or stationary Cursor with moving Timeline and Markers.

Movie Exporter 120

The final step in Movie Creation is to save the Movie in a format suitable for sending the Movie from the Movie-Creation Computer 100 to a user who is viewing the Movie on another computer, the Movie-Viewing Computer 2300. This step in FIG. 1 is the Movie Exporter 120 that extracts all data relevant to a Movie and stores it in a compact Movie Export File 122 suitable for transfer to Movie viewers using a different computer. The process for creating this Movie Export File 122 relies upon the Database Schema of FIG. 3. First the user selects the field MovieName from the Movies table 316. Then the Movie Exporter 120 selects all rows in the MoviesEventJunction 318 that match on the field MovieName. Then the Movie Exporter extracts all rows from BaseEvents table 300 that match these selected rows in MoviesEventJunction 318. Then the Movie Exporter follows the remaining relationships in FIG. 3 to extract all rows in Snapshot Events 314, Projects 302, EventClassifications 304, Snapshots 312, EventPredecessorJunction 306, AttachmentEventJunction 310 and Attachments 308 that are referenced by the selected rows in BaseEvents 300. Next the Movie Exporter compresses all of these rows and stores them in the Movie Export File 122 so that they can later be extracted as the Database Subset. Finally, the Movie Exporter copies and compresses all the Attachment files in the Attachment Repository 113 that are referenced by the selected rows in the Attachments table 308 into a subset of Attachment files for the Movie and places them in the Movie Export File 122 so that they can later be extracted as the Attachment Repository Subset.

We have now completed the review of all the steps shown in FIG. 1, which describes the Movie-Creation System on the Movie-Creation Computer 100. To complete the invention, we now describe the Movie-Viewing System shown in FIG. 23, which occurs on the Movie-Viewing Computer 2300.

Movie Importer 2302

The Movie Importer 2302 reverses the steps described above for the Movie Exporter 120 in FIG. 1. The Movie Importer 2302 decompresses the data in the Movie Export File 2304, recreating both the Attachment Repository Subset 2306 and the Database Subset 2308 and storing both of these on the Movie-Viewing Computer 2300. The Attachment Repository Subset 2306 is the subset of the Attachment Repository 113 that contains all the Attachment files corresponding to the Movie being imported. Likewise the Database Subset 2308 contains all the tables described in the schema of FIG. 3 but contains only those rows in each table that correspond to the Movie being imported.

Engine 2310

The Engine 2310 controls the playback of the imported Movie and displays it to the user on the Movie Viewing Computer 2300, allowing the user to view the animated presentation of Events and to explore Events' Attachments and Dependencies. The steps executed by the Engine 2310 are identical to the steps executed by the Engine 118 of the Movie-Creation System of FIG. 1, the only change being that the steps are carried out on the Attachment Repository Subset 2306 and the Database Subset 2308 rather than on the Attachment Repository 113 and the Database 106. Because the steps for Engine 2310 are identical to the steps for Engine 118, the description of these steps will not be repeated here.

Thus it can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A computer-implemented method for collecting, animating and highlighting in chronological sequence to present a progression and relationship of interrelated Events, the method comprising:

providing a computer connected to a screen;

presenting a timeline on the screen, the timeline being generated by the computer and representing a range of calendar dates;

providing a set of Event data about a protect plan, the Event data comprising a description about a set of project tasks that occurred or are to occur on at least one date and Event description information corresponding to the project tasks occurring in the project plan, information corresponding to when changes occur in the project plan, and information corresponding to when changes occur in Event times for the tasks, to form a database and storing the database in the computer, the database having a schema comprising:

a base-events table comprising information corresponding to the project tasks occurring in the project plan and a plurality of fields including a unique Event identifier associated with each Event and a project identifier for a project to which the Event belongs;

a snapshots table, wherein a snapshot comprises a snapshot time at which the project plan changes along the timeline, the snapshots table comprising a plurality of fields including a unique snapshot identifier and the snapshot time at which a change in the project plan occurs;

a snapshot-events table comprising information corresponding to the changes in Event times at said snapshot times and a plurality of fields including the unique Event identifier from the base-events table, the unique snapshot identifier from the snapshots table, and a new end time for the Event;

selecting at least one subset of Events from the set of Event data, the subset of Events to be presented and graphically related to other Events on the screen, by filtering the rows in the base-events table;

assigning properties to a manner of presentation of the subset of Events to be presented on the screen, the properties including assigning a color to each Event in the subset of Events and assigning a swim lane to each Event in the subset of Events;

presenting event markers on the screen, each event marker being correlated with the timeline and representing the existence of an Event from the subset of Events; and providing an engine for moving a cursor along the timeline to represent a forward or a backward change of snapshot time along the timeline, the engine computing at least one new Event time for the Events presented on the screen by using the cursor time to select a snapshot from the snapshots table and using the snapshots-events table to compute at least one new Event time at the snapshot.

2. A method according to claim 1 and further comprising the step of displaying Event relationships on the screen as the engine highlights at least one of the markers representing an Event from the Event data contained in the database.

3. A method according to claim 2 wherein the step of displaying Event relationships on the screen is carried out in response to a user input when the user selects the marker representing an Event.

4. A method according to claim 3 wherein the user input is pressing an input button on a mouse type input device having at least two input buttons, and the mouse type input device being programmed with one of the input buttons activating the step of displaying Event relationships on the screen as the response to the user input.

5. A computer-implemented method for collecting, animating in chronological sequence, and presenting a progression of related Events on a screen, the method comprising:
providing a computer and a computer screen;
presenting a timeline on the screen, the timeline being generated by the computer and representing a range of calendar dates;
providing a set of Event data about a project plan, the Event data comprising a description about a set of project tasks that occurred or are to occur on at least one date and Event description information corresponding to tasks or occurring in the project plan, information corresponding to when changes occur in the project plan, and information corresponding to changes in Event times for the tasks, to form a database and storing the database in the computer, the database having a schema comprising;
a base-events table comprising information corresponding to tasks occurring in the project plan and a plurality of fields including a unique Event identifier associated with each Event and a project identifier for a project to which the Event belongs;
a snapshots table, wherein a snapshot comprises a snapshot time at which the project plan changes along the timeline, the snapshots table comprising a plurality of fields including a unique snapshot identifier and the snapshot time at which a change in the project plan occurs;
a snapshot-events table comprising information corresponding to the changes in Event times at said snapshot times and a plurality of fields including the unique Event identifier from the base-Events table, the unique snapshot identifier from the snapshots table, and a new end time for the Event;
selecting a subset of Events from the set of Event data, the subset of Events to be presented by filtering the rows in the base-events table;
providing a cursor that the user can position at times along said timeline by means comprising dragging said cursor to a new time, using VCR style controls to single-step said cursor, and using VCR controls to cause the cursor to automatically move in response to a timer;
assigning properties to a manner of presentation of the set of Events to be presented, the properties including assigning swim lanes to each set of Events presented on the screen; and,
providing an engine that displays each Event to be presented as an event marker positioned vertically in said assigned swim lane and positioned horizontally in relation to the timeline based upon a start time and an end time computed from the snapshot whose snapshot interval contains the cursor time.

6. A method according to claim 5 and further comprising the step of displaying Event relationships as the engine displays each event marker, the step of displaying Event dependencies comprising displaying related Events from the database.

7. A method according to claim 6 wherein the step of displaying Event dependencies is carried out in response to a user input when the user selects the marker representing an Event.

8. A method according to claim 7 wherein the user input is pressing an input button on a mouse type input device having at least two input buttons, and the mouse type input device being programmed with one of the input buttons activating the step of displaying Event dependencies as the response to the user input.

9. A method according to claim 8 wherein the Event data comprises data relating to at least one persistent Event in both the base-events table and the snapshot-events table and data relating to at least one transitory Event in the base-events table but not in the snapshot-events table and further comprising the step of highlighting an Event marker for each said transitory Event when a start time or end time of said transitory Event is inside the time window containing the cursor.

10. A method according to claim 5 wherein the relative motion of cursor and timeline is accomplished by holding the cursor stationary and moving the timeline and Event markers.

11. A method according to claim 5 wherein the step of filtering the base-event table on one or more of its columns includes selectively presenting the Events as a grid view on said screen.

12. A method according to claim 5 and further comprising the step of displaying one or more attachments associated with an Event.

* * * * *